(12) United States Patent
Vikberg et al.

(10) Patent No.: US 8,880,073 B2
(45) Date of Patent: Nov. 4, 2014

(54) HANDOVER ROUTING IN CS-OVER-LTE-VIA-GAN SOLUTIONS

(75) Inventors: Jari Vikberg, Järna (SE); Göran Rune, Linköping (SE); Häkan Axelsson, Linköping (SE); Magnus Hallenstål, Täby (SE); Thomas Johansson, Åby (SE); Tomas Nylander, Värmdö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 554 days.

(21) Appl. No.: 13/132,456
(22) PCT Filed: Dec. 21, 2009
(86) PCT No.: PCT/IB2009/007848
§ 371 (c)(1),
(2), (4) Date: Jun. 2, 2011

(87) PCT Pub. No.: WO2010/073098
PCT Pub. Date: Jul. 1, 2010

(65) Prior Publication Data
US 2011/0230193 A1    Sep. 22, 2011

Related U.S. Application Data

(60) Provisional application No. 61/140,393, filed on Dec. 23, 2008.

(51) Int. Cl.
*H04W 4/00* (2009.01)
*H04W 36/00* (2009.01)
(52) U.S. Cl.
CPC .................................. *H04W 36/0022* (2013.01)
USPC ........ 455/436; 455/435.1; 455/440; 455/439; 370/331

(58) Field of Classification Search
CPC .................................................. H04W 36/0022
USPC ........................ 370/331–338; 455/432.1–442
See application file for complete search history.

(56) References Cited

U.S. PATENT DOCUMENTS

2008/0137612 A1* 6/2008 Gallagher et al. ............ 370/331
2008/0159223 A1   7/2008 Palat et al.

(Continued)

FOREIGN PATENT DOCUMENTS

EP   1 983 796 A1   10/2008
EP   2 043 378 A1   4/2009

(Continued)

OTHER PUBLICATIONS

3GPP. 3rd Generation Partnership Project; Technical Specification Group Services and System Aspects; General Packet Radio Service (GPRS) enhancements for Evolved Universal Terrestrial Radio Access Network (E-UTRAN) access (Release 8). 3GPP TS 23.401 v8.4.1 (Dec. 2008).

(Continued)

*Primary Examiner* — Opiribo Georgewill

(57) ABSTRACT

A method and various devices (e.g., MME, GANCs, UE) are described herein for preventing a CS domain call from being dropped during a CSoLTEvGAN towards GERAN/UTRAN handover procedure.

24 Claims, 18 Drawing Sheets

(56) References Cited

U.S. PATENT DOCUMENTS

| | | |
|---|---|---|
| 2010/0052593 A1 | 3/2010 | Kishimoto et al. |
| 2010/0097990 A1 | 4/2010 | Hallenstal et al. |
| 2010/0226310 A1 | 9/2010 | Kuparinen et al. |
| 2011/0110326 A1* | 5/2011 | Rexhepi et al. ............... 370/331 |

FOREIGN PATENT DOCUMENTS

| | | |
|---|---|---|
| WO | WO 2006/056069 A1 | 6/2006 |
| WO | WO 2008/081310 A1 | 7/2008 |
| WO | WO 2008/148429 A1 | 12/2008 |

OTHER PUBLICATIONS

3GPP. 3rd Generation Partnership Project; Technical Specification Group GSM/EDGE: Radio Access Network; Generic Access Network (GAN); Stage 2 (Release 8). 3GPP TS 43.318 v8.3.0 (Aug. 2008).

3GPP. 3rd Generation Partnership Project; Technical Specification Group GSM/EDGE Radio Access Network; Generic Access Network (GAN); Mobile GAN Interface Layer 3 Specification (Release 8). 3GPP TS 44.318 v8.4.0 (Dec. 2008).

3GPP. 3rd Generation Partnership Project; Technical Specification Group Services and System Aspects; Study on Circuit Switched (CS) Domain Services Over Evolved Packet Switched (PS) Access; Stage 2 (Release 9). 3GPP TS 23.879 v1.1.1 (Dec. 2008).

3GPP. 3rd Generation Partnership Project; Technical Specification Group Services and System Aspects; Single Radio Voice Call Continuity (SRVCC); Stage 2 (Release 8). 3GPP TS 23.216 v8.2.0 (Dec. 2008).

3GPP. 3rd Generation Partnership Project; Technical Specification Group Radio Access Network: Evolved Universal Terrestrial Radio Access (E-UTRA); Radio Resource Control (RRC); Protocol Specification (Release 8). 3GPP TS 36.331 v8.4.0 (Dec. 2008).

$3^{rd}$ Generation Partnership Project; Technical Specification Group Services and System Aspects; Circuit Switched Fallback in Evolved Packet System; Stage 2 (Release 8). 3GPP TS 23.272 v8.2.0 (Dec. 2008).

* cited by examiner

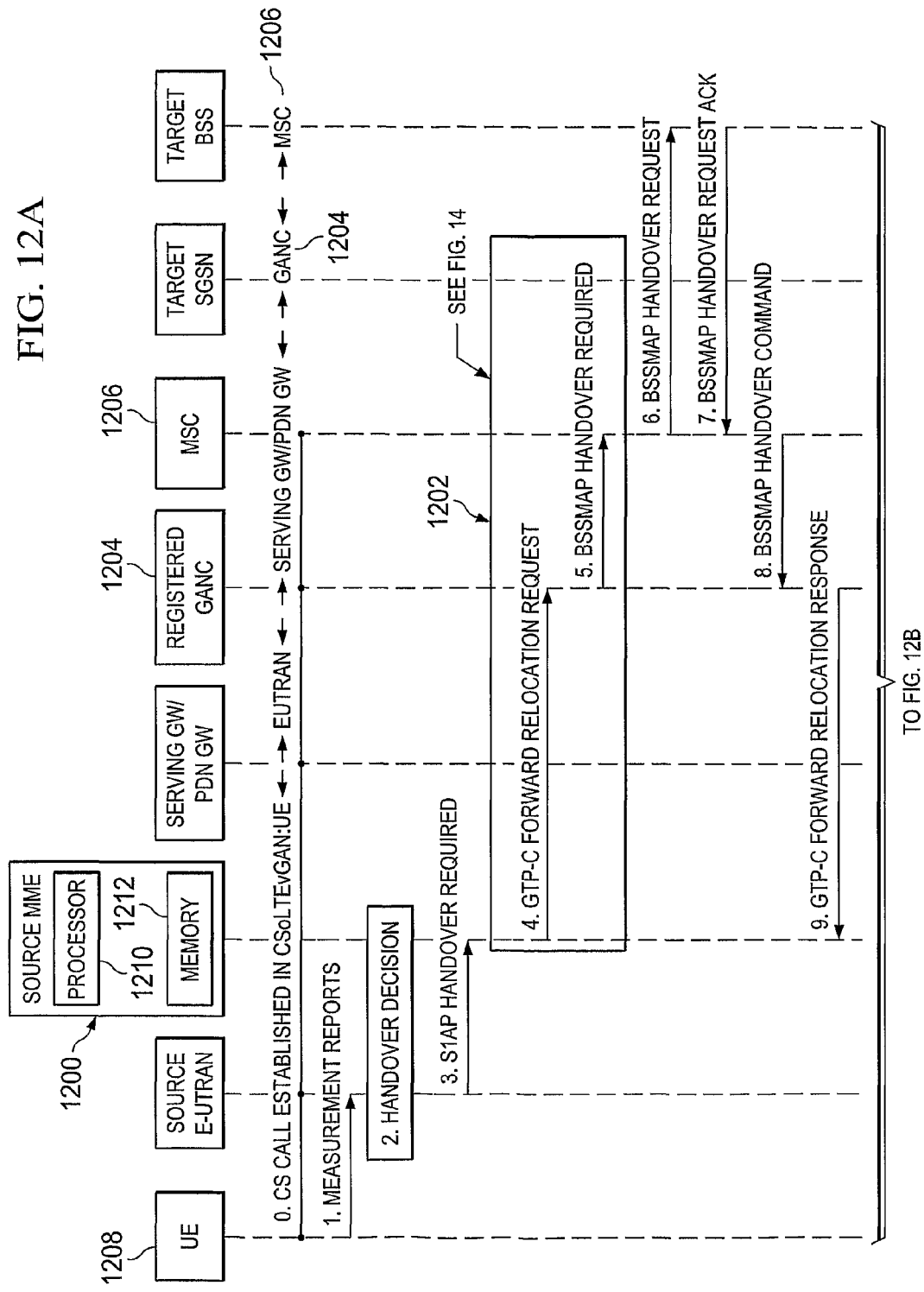

HANDOVER ROUTING IN CS-OVER-LTE-VIA-GAN SOLUTIONS

CLAIM OF PRIORITY

This application is a 371 of PCT/IB09/07848 filed on Dec. 21, 2009 which claims the benefit of US Provisional Application No. 61/140,393, filed Dec. 23, 2008, the disclosures of which is fully incorporated herein by reference.

TECHNICAL FIELD

The present invention relates in general to the telecommunications field and, in particular, to a method and various devices (MME, GANCs, UE) for preventing a CS domain call from being dropped during a CSoLTEvGAN towards GERAN/UTRAN handover procedure.

BACKGROUND

The following abbreviations are herewith defined, at least some of which are referred to within the following description of the prior art and the present invention.
 3GPP 3rd Generation Partnership Project
 AAA Authentication, Authorization and Accounting
 A-GW Access Gateway
 AGW-UP Access Gateway User Plane (serving GW plus PDN GW)
 AMR Adaptive Multi Rate
 AP Access Point
 BSC Base Station Controller
 BSS Base Station Subsystem
 BSSAP Base Station Subsystem Application Part
 CBC Cell Broadcast Centre
 CC Call Control
 CGI Cell Global Identity
 CM Connection Management
 CN Core Network
 CS Circuit Switched
 CSR Circuit Switched Resources
 DNS Domain Name Service/Server
 DTM Dual Transfer Mode
 EPC Evolved Packet Core
 ESP Encapsulating Security Payload
 E-UTRAN Evolved-UMTS Radio Access Network
 FQDN Fully Qualified Domain Name
 GA Generic Access
 GA-CSR Generic Access-Circuit Switched Resources
 GAN Generic Access Network
 GANC Generic Access Network Controller
 GERAN GSM EDGE Radio Access Network
 GPRS General Packet Radio Service
 GSM Global System for Mobile communications
 GTP GPRS Tunneling Protocol
 HLR Home Location Register
 HSS Home Subscriber Server
 IMS IP Multimedia Subsystem
 IMSI International Mobile Subscriber Identity
 IP Internet Protocol
 IWU Interworking Unit
 LAI Location Area Identity
 LTE Long-Term Evolution
 MAC Medium Access Control
 MGW Media GateWay
 MM Mobility Management
 MME Mobile Management Entity
 MS Mobile Station
 MSC Mobile Switching Centre
 MTP Message Transfer Part
 OFDM Orthogonal Frequency Division Multiplex
 PCRF Policy and Charging Rules Function
 PCSC Packet Circuit Switch Controller
 PDCP Packet Data Convergence Protocol
 P-GW Packet-Gateway
 PDN-GW Packet Data Network-Gateway
 PMSC Packet MSC
 PS Packet Switched
 PSS Packet Switched Services
 PSTN Public Switched Telephone Network
 RAN Radio Access Network
 RANAP Radio Access Network Application Part
 RC Resource Control
 RLC Radio Link Control
 RTP Real Time Protocol
 SCCP Signalling Connection Control Part
 SAE System Architecture Evolution
 SC-FDMA Single Carrier-Frequency Division Multiple Access
 SEGW Security Gateway
 SGSN Serving GPRS Support Node
 S-GW Serving Gateway
 SMLC Serving Mobile Location Centre
 SMS Short Message Service
 SRVCC Single Radio Voice Call Continuity
 SS Supplementary Service
 TA Tracking Area
 TAU Tracking Area Update
 TCP Transmission Control Protocol
 UDP User Datagram Protocol
 UE User Equipment
 UMA Unlicensed Mobile Access
 UMTS Universal Mobile Telecommunications System
 UTRAN UMTS Radio Access Network
 WCDMA Wideband Code Division Multiple Access The present invention described herein relates to a solution called CS-over-LTE-via-GAN (CSoLTEvGAN, also called Voice over LTE Generic Access (VoLGA)) and a handover from CSoLTEvGAN towards GERAN/UTRAN. Hence, a brief description is provided next about the current state of the art associated with CSoLTEvGAN and the CSoLTEvGAN to GERAN/UTRAN handover procedure. This brief description has been divided into several sections as follows:
 CSoLTE (Circuit Switched Services over LTE) background and the different possibilities for CSoLTE solutions.
 GAN background.
 CSoLTEvGAN background.
 Principles for handover from CSoLTEvGAN towards GERAN/UTRAN.
 Problems with existing solutions.
CSoLTE Background Mobile CS services based on GSM and WCDMA radio access are a world-wide success story and allow a user with a single subscription to obtain telecommunication services in almost all countries of the world. Also today, the number of CS subscribers is still growing rapidly, boosted by the roll-out of mobile CS services in densely populated countries such as India and China. This success story is furthermore extended by the evolution of the classical MSC architecture into a softswitch solution which allows the use of a packet transport infrastructure for mobile CS services.

Recently the 3GPP work item "Evolved UTRA and UTRAN" (started in summer 2006) defined a Long-Term Evolution (LTE) concept that assures the competitiveness of 3GPP-based access technology. The LTE concept was preceded by an extensive evaluation phase of possible features and techniques in RAN workgroups which concluded that the agreed system concepts can meet most of the requirements and that no significant issue was identified in terms of feasibility. The LTE will use OFDM radio technology in the downlink and SC-FDMA for the uplink, allowing at least 100 Mbps peak data rate for downlink communications and 50 Mbps peak data rate for uplink communications. LTE radio can operate in different frequency bands and is therefore very flexible for deployment in different regions of the world.

In parallel to the RAN standardization, the 3GPP also supported a System Architecture Evolution (SAE) work item to develop an evolved packet core network. The resulting SAE core network is made up of core nodes, which are further, split, into a Control Plane mode (MME), a User Plane node (S-GW), and Packet Data Network GW (PDN GW or P-GW). In this document, a co-location of S-GW and P-GW is denoted as an Access GW (AGW). FIG. 1 (PRIOR ART) is a block diagram illustrating a LTE/SAE architecture according to 3GPP TS 23.401 V8.4.1 (the contents of which are incorporated by reference herein).

The LTE/SAE architecture has been specified such that only a Packet Switched (PS) domain will be supported, i.e. all services are to be supported via this PS domain. However, GSM (via DTM) and WCDMA provide both PS and CS access simultaneously. So, if telephony services are to be deployed over LTE radio access, an IMS based service engine is mandatory. It has been investigated how to use the LTE/SAE architecture as the access technology to the existing CS core domain infrastructure. The investigated solutions are called "CS over LTE" solutions and the basic architecture for these solutions is shown in the block diagram of FIG. 2 (PRIOR ART).

In the CSoverLTE architecture, a Packet MSC (PMSC) can serve both traditional 2G and 3G RANs plus the new CS (domain) over the LTE based solutions. The PMSC contains two new logical functions which are called Packet CS Controller (PCSC) and Interworking Unit (IWU) both of which are described next with respect to FIG. 3 (PRIOR ART).

The communication between the terminal (MS) and the PMSC is based on the SGi interface. This means that all direct communication between the terminal and the PCSC and the IWU in the PMSC is based on IP protocols and that the MS is visible and reachable using an IP-address via the AGW. This communication is further divided into two different interfaces, U8c for the control plane and U8u for the user plane. FIG. 4 (PRIOR ART) shows the CSoLTE control plane architecture (i.e., the U8c interface) between the terminal and the PMSC. FIG. 5 (PRIOR ART) shows the CSoLTE user plane architecture (i.e., the U8u interface) between the terminal and the PMSC. The PCSC has also an Rx interface to the PCRF for allocation of the LTE/SAE bearers (see FIG. 3).

Three different solutions for providing CSoLTE service have been identified so far. The first solution is called "CS Fallback" where the terminal performs SAE MM procedures towards the MME while camping on LTE access. The MME registers the terminal within the MSC-S for CS based services. Then, when a page for CS services is received in the MSC-S it is forwarded to the terminal via the MME and the terminal performs fallback to the 2G or 3G RANs. Similar behavior applies for terminal originated CS services and when these are triggered and the terminal is camping on LTE access, it will fallback to 2G or 3G RANs and trigger the initiation of the CS service. This solution has been described in co-assigned U.S. patent application Ser. No. 12/531,651 and specified in 3GPP TS 23.272 V8.2.0 (the contents of both documents are incorporated by reference herein).

The second solution is called CS over LTE Integrated (CSoLTE-I). In this solution the same SAE MM procedures as for "CS Fallback" are used, but instead of performing a fallback to the 2G or 3G RANs, the terminal performs all the CS services over the LTE access. This means that the CS services (also called Connection Management, CM, procedures) are transported over IP-based protocols between the PMSC and the terminal using the LTE access and the SAE nodes like AGW-UP.

The third solution is called CS over LTE Decoupled (CSoLTE-D). In this case both MM and CM procedures are transported over IP-based protocols directly between the PMSC and the terminal using the LTE access and the SAE user plane nodes like the AGW-UP. This solution has been described in the co-assigned U.S. patent application Ser. No. 12/522,408 (the contents of which are incorporated by reference herein).

GAN Background

3GPP has standardized the Generic Access Network (GAN)-concept starting from 3GPP Release-6. The correct name is "Generic Access to A/Gb Interfaces" and this standardization was based on the Unlicensed Mobile Access (UMA) de-facto specifications.

GAN provides a new Radio Access Network (RAN) and the node corresponding to GERAN BSC is called a Generic Access Network Controller (GANC). GAN is specified in the 3GPP TS 43.318 V8.3.0 and 3GPP TS 44.318 V8.4.0 (the contents of both documents are incorporated by reference herein). FIG. 6 (PRIOR ART) shows the functional architecture of GAN as indicated in 3GPP TS 43.318. The basic principle is that the MS/UE is a dual-mode, dual radio handset including for example both WiFi and 3GPP-macro radio support (GSM, WCDMA or both). For instance, the MS connects to a WiFi Access point (AP) (not shown) using the WiFi Radio. The GAN standard defines how the MS can function in GAN mode and access the services provided by the GSM CN (Core Network) using the Up-interface between the MS and the GANC.

The initial GAN standard has been called "2G-GAN" or "GSM-GAN" as the standard GSM interfaces, A and Gb are used between the GANC and the CN. In addition, work is currently ongoing to standardize a "3G-GAN" or "WCDMA-GAN" solution. In this case, the GANC will use the standard WCDMA interfaces, for example the Iu-cs and the Iu-ps interfaces to connect to the CN. The resulting standard could be called "Generic Access to Iu interface" or the shorter term "GAN-Iu".

FIG. 7 (PRIOR ART) has been provided to show the CS Domain Control Plane Architecture related to GAN and the Up-interface. The main principle is that the GANC uses the normal A-interface signaling towards the MSC and interworks the related protocol, like BSSAP, towards the relevant GAN-protocols, like GA-CSR (Generic Access, Circuit Switched Resources), in both directions.

CSoLTEvGAN Background

The CSoLTEvGAN solution has not yet been standardized but exists as one of the alternatives for CS service support over the LTE described in 3GPP TR 23.879 V1.1.1 (the contents of which are incorporated herein). The basic idea for the CSoLTE alternative is to see LTE as a Generic Access Network and use the GAN protocols for the control and user planes. FIG. 8 (PRIOR ART) is a diagram illustrating the CSoLTEvGAN architecture.

One major difference for the GANC in this situation when compared to the aforementioned GAN solution is that the handover is triggered using the SRVCC (Single Radio Voice Call Continuity) procedure over the Sv' interface (see FIG. 9).

The SRVCC procedure is a procedure in 3GPP to switch an IMS-anchored voice call in LTE to the CS domain (MSCs) in GSM or WCDMA. Only the handover part is used from the SRVCC solution as there is no need for any IMS Session transfer procedure. The SRVCC procedure has been standardized in 3GPP TS 23.216 V8.2.0 (the contents of which are incorporated by reference herein).

There are different ways to select a GANC for the UE (i.e. for GAN registration). One possibility is the EPC-based selection i.e. that the GANC is selected for the UE based on the LTE/SAE cells (E-CGI) and tracking areas (TA) during attach or Tracking area update (TAU) (e.g. that the MME returns the GANC address information to the UE). Still another possibility is that the GANC selects the correct GANC based on the E-CGI and TAI of the current LTE-cell as reported by the UE and then redirects the UE to the correct GANC. In all the different variants, the GANC selection can be DNS-based load balancing in a specific area. This means that a pool of GANCs is serving the whole or parts of the LTE/SAE network and the DNS provides the means to divide the different UEs to different GANCs.

Principles for Handover From Csoltevgan Towards GERAN/UTRAN

The main principle for handover from CSoLTEvGAN towards GERAN/UTRAN is that parts of Single Radio Voice Call Continuity (SRVCC) are used as the handover trigger for handover from CSoLTEvGAN towards GERAN/UTRAN. This means that the MME will trigger the handover as in SRVCC. However, instead of contacting the MSC over the Sv-interface, the MME will contact the GANC over Sv' interface (see FIG. 8). So the Sv' interface between the MME and the GANC is used to support the Handover from CSoLTEv-GAN to GERAN/UTRAN procedure. This interface is denoted as Sv' since it is a reference point between MME and GANC and may only implement parts of the current version of the standardized Sv reference point, where Sv is between the MME and MSC. FIG. 9 (PRIOR ART) shows the Sv' interface between the MME and GANC where the Sv' interface is implemented using the protocol GTP.

FIGS. 10A-10B (PRIOR ART) shows the steps for implementing the Handover from CSoLTEvGAN to GERAN/UTRAN procedure. The main part with respect to this particular discussion is that for this handover procedure the Source MME selects the GANC based on the target cell information i.e. the LAI/CGI of the target GERAN/UTRAN cell associated with the moving UE. However, the selected GANC may not be the originally registered GANC which leads to a handover problem as discussed in detail next.

Problems with Existing Solutions

A problem exists because of how the MME selects a GANC during the GAN Registration procedure when the UE is in a LTE cell and how the MME selects a GANC during a CSoLTEvGAN handover procedure when the UE moves from the LTE cell to a GERAN/UTRAN cell. As discussed above, during the GAN registration the MME selects a GANC for the UE based on LTE/SAE cells and/or Tracking Areas plus DNS based load balancing may be used. Then during the handover, the MME selects a GANC based on the target GERAN/UTRAN cell identifier or LAI. The main problem is that the handover request (from CSoLTEvGAN to GERAN/UTRAN procedure) from the MME needs to be addressed to the same GANC that was selected for the UE during GAN Registration. Thus, if the MME selects the wrong GANC during the SRVCC handover procedure then the MME will send the handover request to the wrong GANC. If this occurs, then the Handover procedure will fail which will most likely lead to the dropping of calls and unsatisfied customers.

FIG. 11 (PRIOR ART) is an exemplary network scenario which has been provided to further highlight this particular problem. A UE is shown in the LTE cell E-CGI-3 belonging to TA with TAI-1. GANC1, GANC2 or GANC3 can be selected by the UE at registration based on the LTE cell and TA and load balancing between GANCs. In this example, assume the UE at registration selects GANC2. If the UE enters CS active state via GANC2 and MSC1 and then later on moves towards GERAN coverage shown with the GSM cell CGI-4 belonging to LA with LAI-1, then the CSoLTEvGAN handover procedure would be triggered (i.e. the one based on SRVCC). In this case, the source MME would need to select the correct GANC, but the information for the GANC selection in the Source MME is only the GSM Target cell i.e. CGI-4 and LAI-1. This is not enough information for the MME to know that it should select GANC2 in this case. Accordingly, there is a need to address this problem to ensure that the handover will not fail. Plus, there is a need to address this problem without introducing any changes or at least minimizing changes to the MME. These needs and other needs have been satisfied by the present invention.

EP-A-2043378 discloses a method for controlling registration of an MS and a Generic Access Network Controller (GANC). The method includes a GANC receiving a registration message from an MS, when there is an ongoing service between the GANC and the MS, the GANC triggers a handover procedure, or the GANC does not respond to the registration message. The GANC includes a receiving unit, a transmitting unit, a determining unit adapted to determine whether a registration request message should be redirected according to current network condition and registration information of an MS, and a controlling unit adapted to instruct the message transmitting unit, according to the determined result to send a notification message to the MS instructing MS's corresponding operation.

WO-A-2008081310 discloses a method that includes initiating a handover procedure during an ongoing call of a wireless user terminal in one of a circuit switched domain or a packet switched domain, setting parameters allowing the other domain to determine the actual resources needed to continue the call in the other domain, sending an indication of these parameters towards a network element of the other domain and completing the handover procedure. When the ongoing call is in the circuit switched domain completing the handover procedure results in handing over the ongoing call to the packet switched domain, and when the ongoing call is in the packet switched domain completing the handover procedure results in handing over the ongoing call to the circuit switched domain. For example, the circuit switched domain may be a GERAN network and the packet switched domain may be an E-UTRAN (LTE) network. In the GERAN network the handover procedure may be accomplished at least in part through a Gs interface between a mobile switching center and a serving general packet radio system support node and/or through a Gb interface between a base station system and the serving general packet radio system support node. The handover procedure is accomplished at least in part by signaling conducted over an S3 interface between the serving general packet radio system support node of the GERAN network and the mobility management entity of the E-UTRAN network.

SUMMARY

A MME, a method, and a system are described in the independent claims of the present application. Advantageous embodiments of the MME, the method, and the system are described in the dependent claims.

In one aspect, the present invention provides a method and MME for preventing a CS domain call of a UE from being dropped during a CSoLTEvGAN to GERAN/UTRAN handover procedure, where the UE registered with one of a plurality of GANCs based on LTE and GAN technology. In one embodiment, the MME includes: (a) processor; and (b) a memory that stores processor-executable instructions where the processor interfaces with the memory and executes the processor-executable instructions to: (1) controlling packet switched bearers used in the CS domain of the UE which involves the registered GANC, where the registered GANC holds a UE GAN registration context and the call in CS domain for the UE; and (2) when the UE moves towards a GERAN/UTRAN, send a handover request for the voice bearer to the registered GANC which will handle the handover request for the call of the UE. The MME not only prevents the call from being dropped but also enables the usage of multiple GANCs for one area together with the SRVCC handover procedure.

In yet another aspect, the present invention provides a selected GANC and a method for preventing a call in CS domain of a UE from being dropped during a handover procedure, where the UE registered with one of a plurality of GANCs based on LTE and GAN technology, where a MME controls packet bearers of the CS domain call of the UE which involves the registered GANC, where the registered GANC holds a UE GAN registration context and the CS domain call for the UE, and when the UE moved towards a GERAN/UTRAN then the MME selected one of the plurality of GANCs based on a GERAN/UTRAN target cell identifier or a LAI associated with a location of the UE and transmitted the handover request to the selected GANC. Upon receiving the handover request, the selected GANC uses a processor and a memory that stores processor-executable instructions where the processor interfaces with the memory and executes the processor-executable instructions to: (1) determine if the UE GAN registration context and the CS domain call for the UE are held therein; (2) if yes, then handle the handover request for the CS domain call of the UE; and (3) if no, then forward the handover request to other GANCs which could possibly hold the UE GAN registration context and the CS domain call for the UE and the one of the other GANCs which holds the UE GAN registration context and the CS domain call for the UE will handle the handover request for the CS domain call of the UE.

In still yet another aspect, the present invention provides a registered GANC and method for preventing a CS domain call of a UE from being dropped during a handover procedure, where the UE registered with one of a plurality of GANCs based on LTE and GAN technology, where a MME controls packet bearers of the CS domain call of the UE which involves the registered GANC, where the registered GANC holds a UE GAN registration context and the CS domain call for the UE. Then, the registered GANC uses a processor and a memory that stores processor-executable instructions where the processor interfaces with the memory and executes the processor-executable instructions to: (1) send GANC address information associated with the registered GANC to the UE such that when the UE moves towards a GERAN/UTRAN the UE has already passed the GANC address information to the MME which then uses the GANC address information to forward the handover request for the CS domain call to the registered GANC.

In yet another aspect, the present invention provides a UE and method for preventing a CS domain call of the UE from being dropped during a handover procedure when a UE originally registered the CS domain call with one of a plurality of GANCs based on LTE and GAN technology, where a MME controls packet bearers of the CS domain call of the UE which involves the registered GANC, where the registered GANC holds a UE GAN registration context and the CS domain call for the UE. Then, the UE uses a processor and a memory that stores processor-executable instructions where the processor interfaces with the memory and executes the processor-executable instructions to: (1) receive GANC address information associated with the registered GANC; and (2) pass the GANC address information to the MME so that when the UE moves towards a GERAN/UTRAN the MME uses the GANC address information to forward a handover request for the CS domain call to the registered GANC.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings.

DETAILED DESCRIPTION

Figure 1:
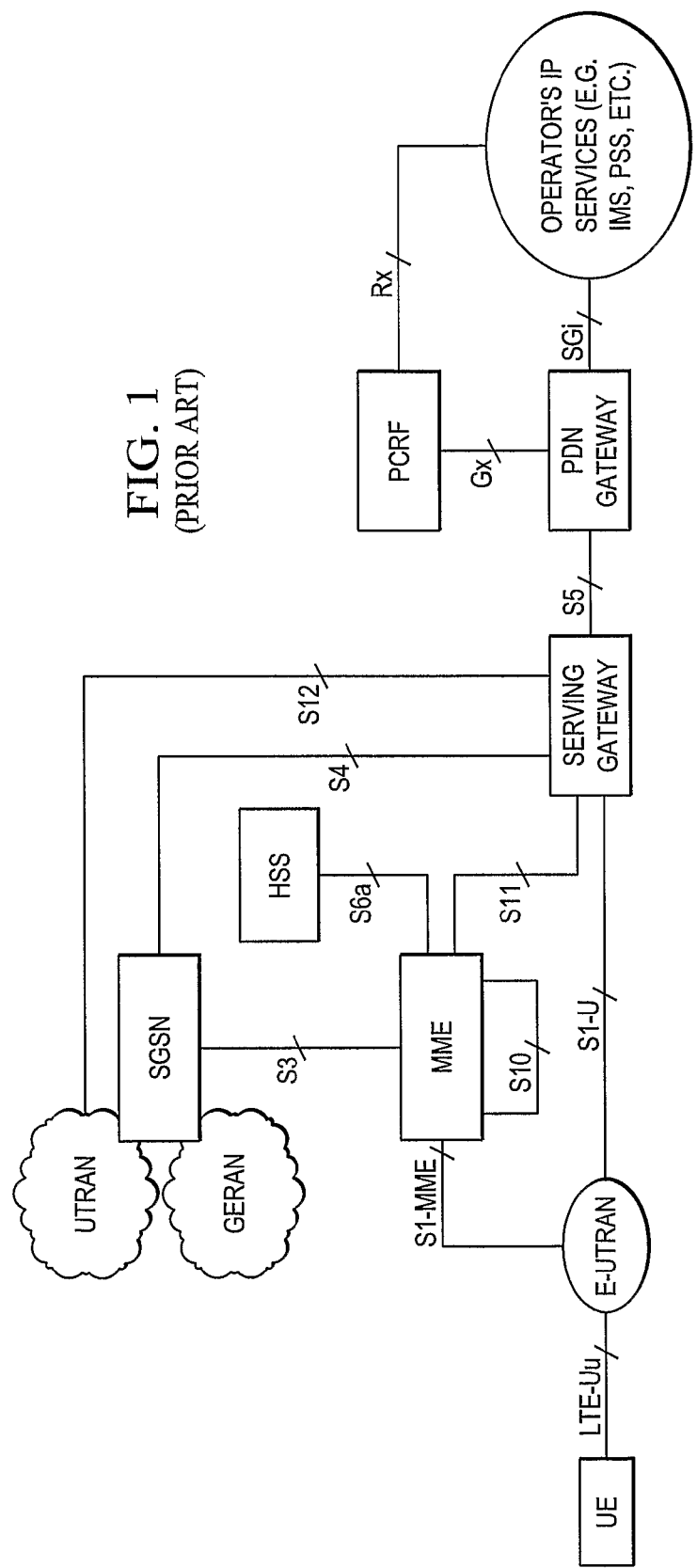
FIGS. 1-5 (PRIOR ART) are various diagrams used to provide some background information associated with Circuit Switched Services over LTE also referred to as CSoLTE.
Figure 2:
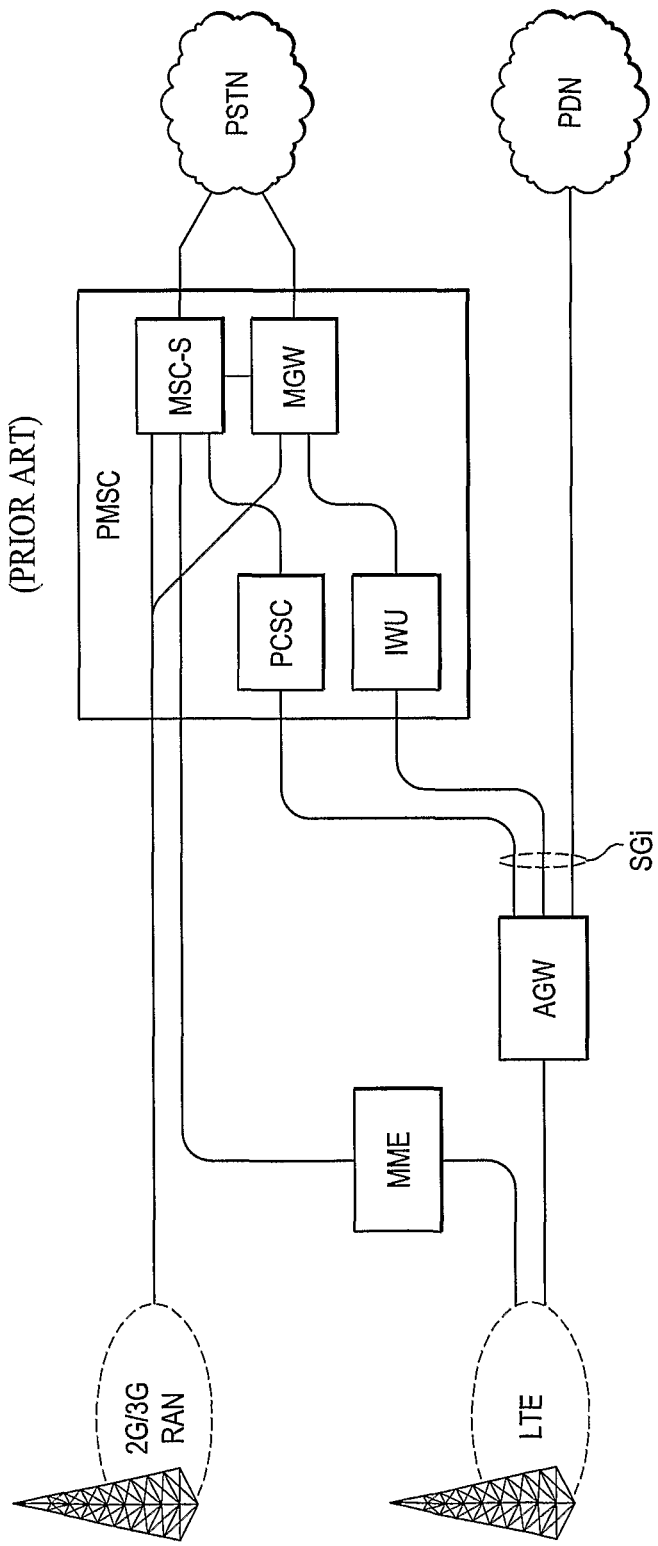
Figure 3:
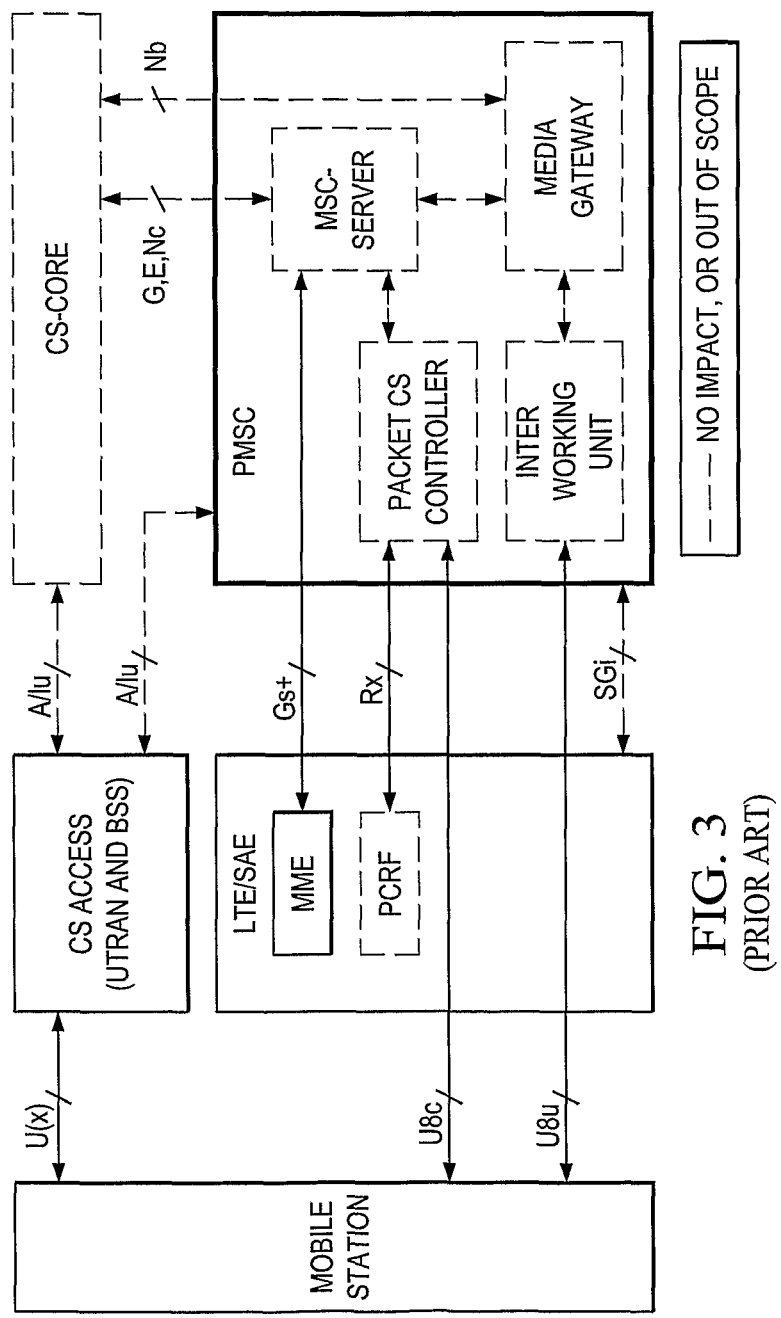
Figure 4:
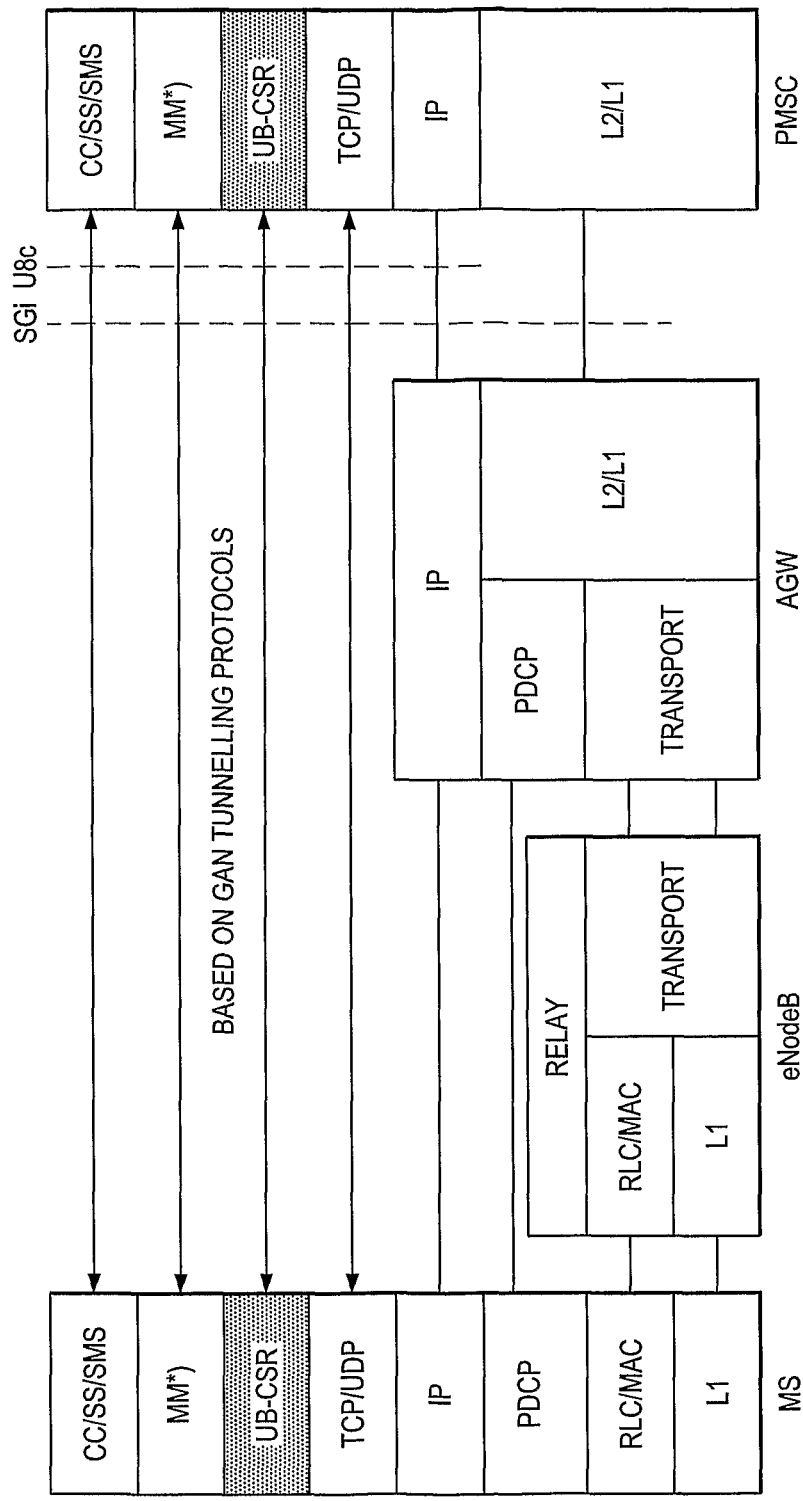
Figure 5:
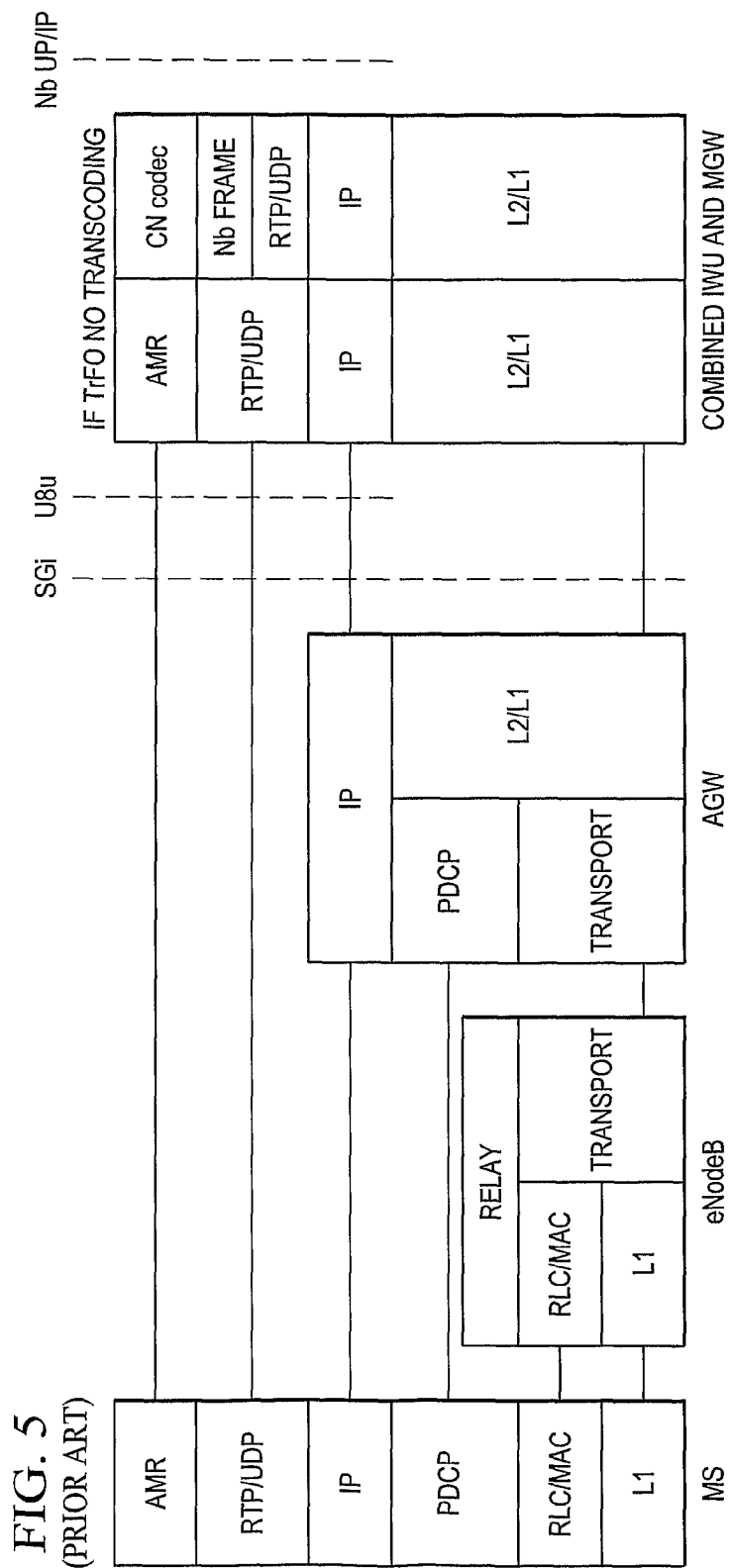
Figure 6:
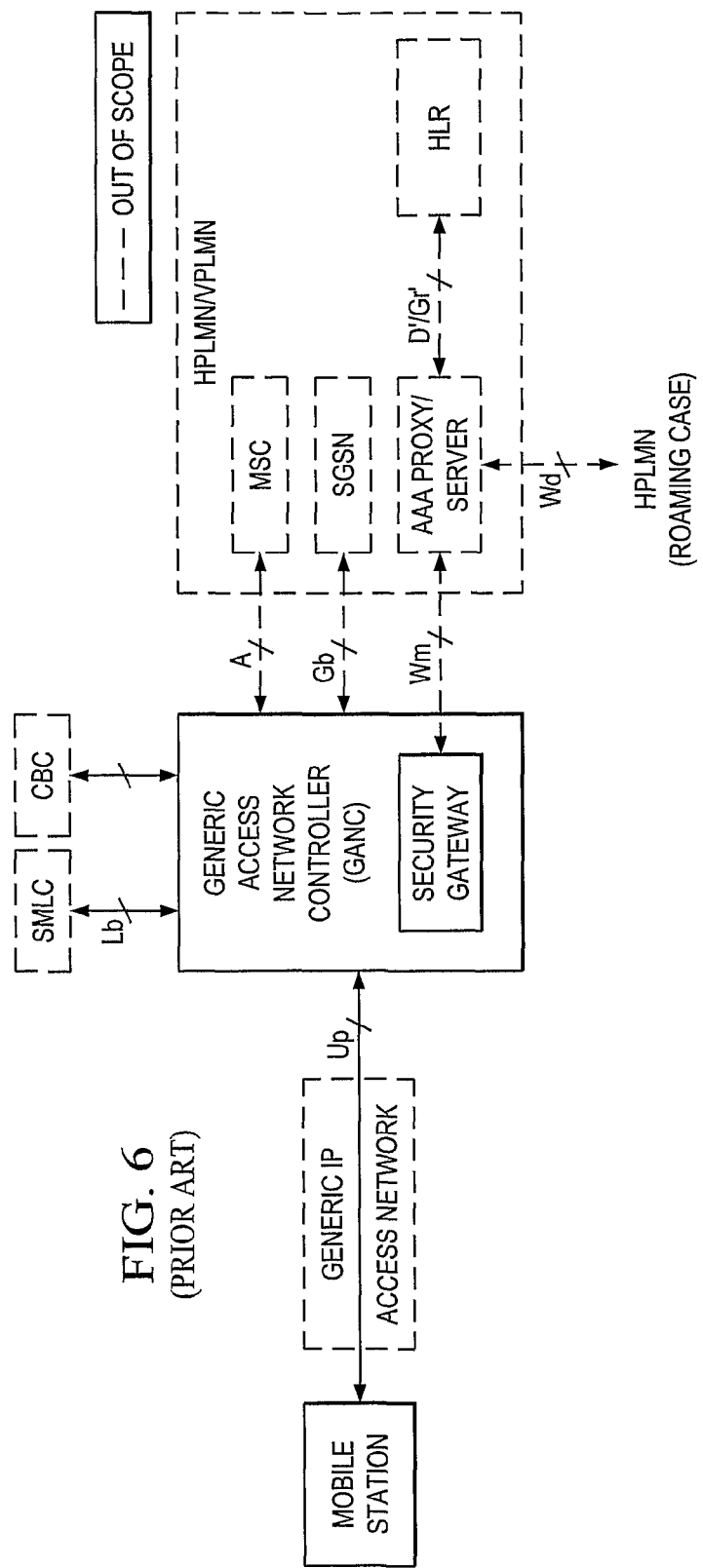
FIGS. 6-7 (PRIOR ART) are various diagrams used to provide some background information associated with a Generic Access Network (GAN)
Figure 7:
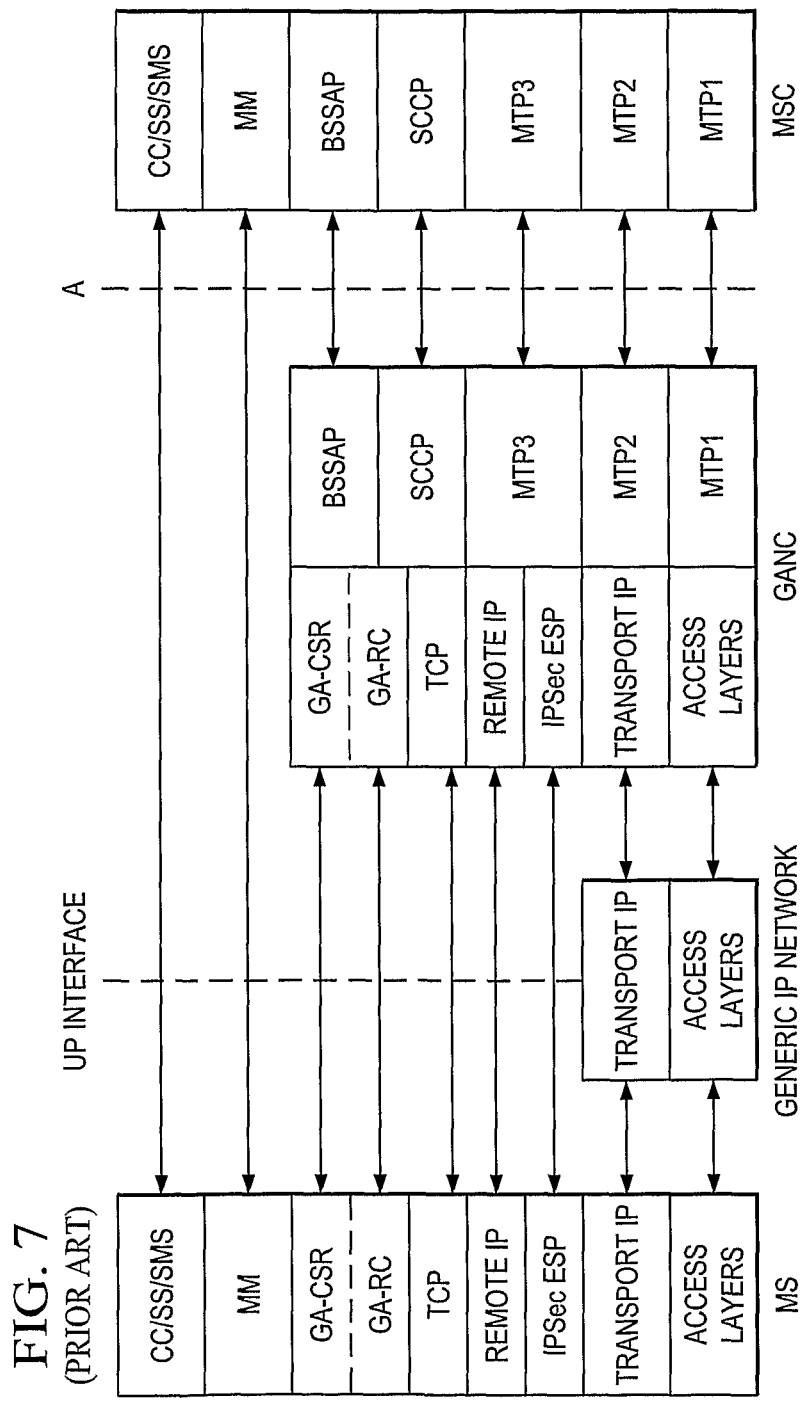
Figure 8:
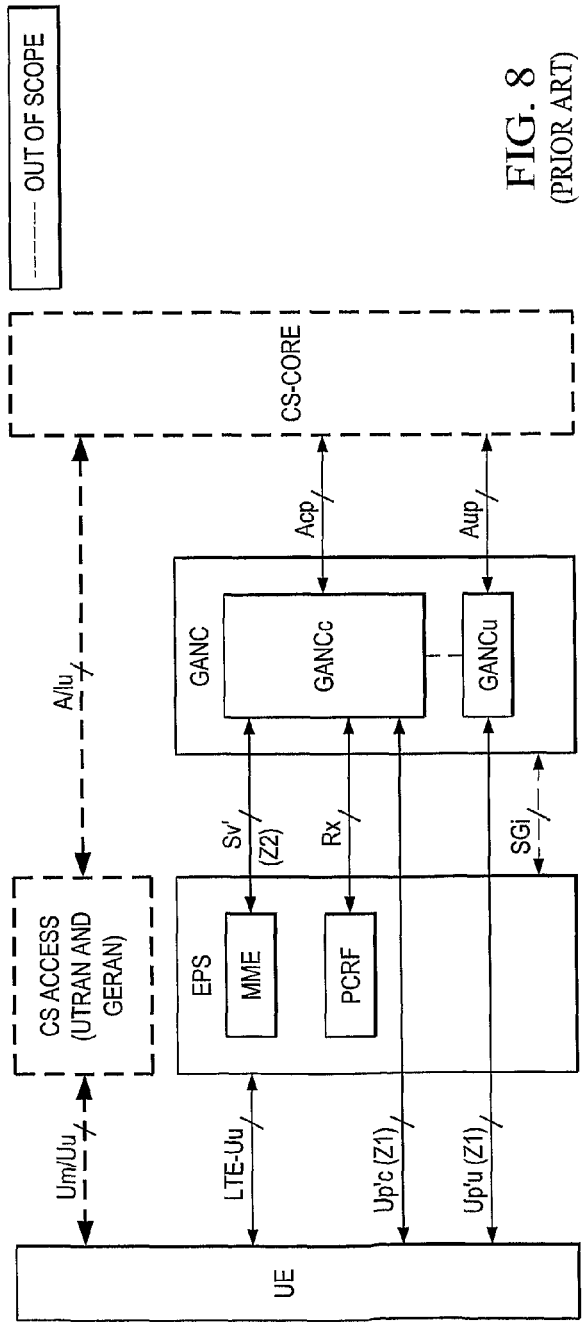
FIG. 8 (PRIOR ART) is a diagram of CSoLTEvGAN architecture used to provide some background information associated with Voice over LTE Generic Access also referred to as CSoLTEvGAN.
Figure 9:
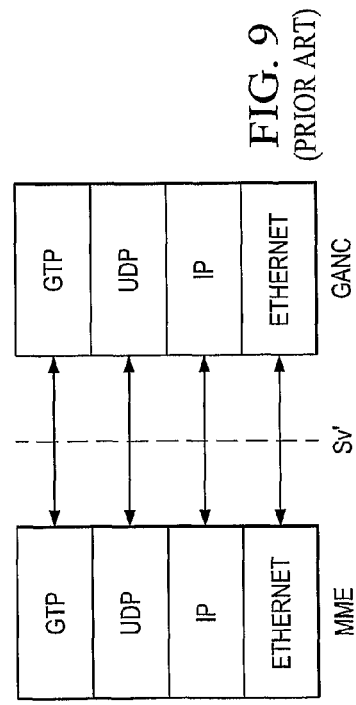
FIGS. 9-10 (PRIOR ART) are various diagrams used to provide some background information associated with the handover from CSoLTEvGAN to GERAN/UTRAN.

In the following description, a brief discussion about the MME and method of the present invention is provided first and then a detailed discussion is provided to describe details and enable a thorough understanding about two different embodiments of the present invention that can be used to prevent CS domain calls from being dropped during CSoLTEvGAN to GERAN/UTRAN handover procedures. It will be apparent to one of ordinary skill in the art having had the benefit of the present disclosure that the present invention may be practiced in other embodiments that depart from the specific details disclosed herein. Moreover, it will be apparent to one of ordinary skill in the art that descriptions of well-known architectures, devices, interfaces and signaling steps have been omitted so as not to obscure the description of the present invention.

The MME and method of the present invention prevent a CS domain call of a UE from being dropped during a CSoLTEvGAN to GERAN/UTRAN handover procedure, where the UE registered with one of a plurality of Generic Access Network Controllers, GANCs based on Long-Term Evolution, LTE, and Generic Access Network, GAN, technology by: (1) controlling packet switched bearers used in the CS domain call of the UE which involves the registered GANC, where the registered GANC holds a UE GAN registration context and the CS domain call for the UE; and (2) upon the UE moving towards a GERAN/UTRAN, sending a handover request for the CS domain call to the registered GANC which will handle the handover request for the CS domain call of the UE. A detailed discussion is provided next about two exemplary embodiments of the present invention.

The main part of the first embodiment is that the MME selects the GANC for handover in the same way as it would select a target MSC in the SRVCC handover procedure. Then, the selected GANC checks to see if it holds the UE GAN registration context of the CS domain call to be handed over. If yes, then the selected GANC handles the handover request. If not, then the selected GANC ensures that the handover request is forwarded to all possible GANCs that might hold the UE GAN registration context and the CS domain call to be handed over. The GANC holding the GANC UE registration context and call will signal back to the MME directly or via the selected GANC and then control the handover. Thereafter, the signalling will go directly between the MME and the GANC holding the UE registration context or the selected GANC will route all handover signalling between the MME and the GANC holding UE registration context and call.

In the first embodiment, the source MME during the handover uses the normal target cell/LA to select a GANC and then sends the handover request to the selected GANC. If the selected GANC does not hold the GAN Registration context for the addressed UE, it will forward the handover request to other defined GANCs. If one of these GANCs is holding the GAN Registration context for the UE then it will act upon the received handover request and trigger the handover procedure towards the MSC. After this, all signaling related to the handover procedure between the MME and MSC is transferred via the firstly addressed GANC and the GANC holding the UE context or via the GANC holding the UE context. In the simplest case, there is only a single Handover Request forwarding by the GANC selected by the MME towards the other GANCs and these other GANCs do not forward the handover request any further. In another case, a "GANC hierarchy" is defined. This means that there can be multiple steps of handover forwarding between the GANCs. For example, the GANC selected by the MME only forwards the handover request to a subset of the GANCs and these GANCs may perform consecutive handover forwarding towards another set of GANC and so on. Of course, specific mechanisms should be used in the last case to ensure that there are no loops in the "GANC hierarchy".

The main part of the second embodiment is that the GANC to which the UE is registered, returns GANC address information to the UE and then the UE passes this information to the MME which will use this information instead of the normal target node selection in SRVCC handover. In the second embodiment, the MME can use the GANC IP address or a string received from the UE to send a GTP-C Forward Relocation Request message to the GANC. The string could either be a FQDN, or a string which the MME could construct a FQDN, or a string naming the GANC for which the MME has a table translating name(string) to GANC IP address. This particular approach requires changes in 3GPP specifications and changes in MME, which of course is a drawback. However, an advantage of this approach is that the MME selects the right GANC directly and no signaling is needed between the GANCs.

In the second embodiment, the UE during the GAN registration procedure receives the registered GANC's IP address or a string which is to be used by the MME for handover signaling. In one example, the UE could add the GANC IP address or string (if string is used to uniquely identify a GANC) in a new or existing NAS message and include it in a 3GPP TS 36.331 ULInformationTransfer message and then the E-UTRAN could pass on the new or existing NAS message to the MME. Then, the MME uses the received information to send the GTP-C Forward Relocation Request to the correct GANC.

First Embodiment

GAN Level Distribution of the Handover Request

Figure 10A:
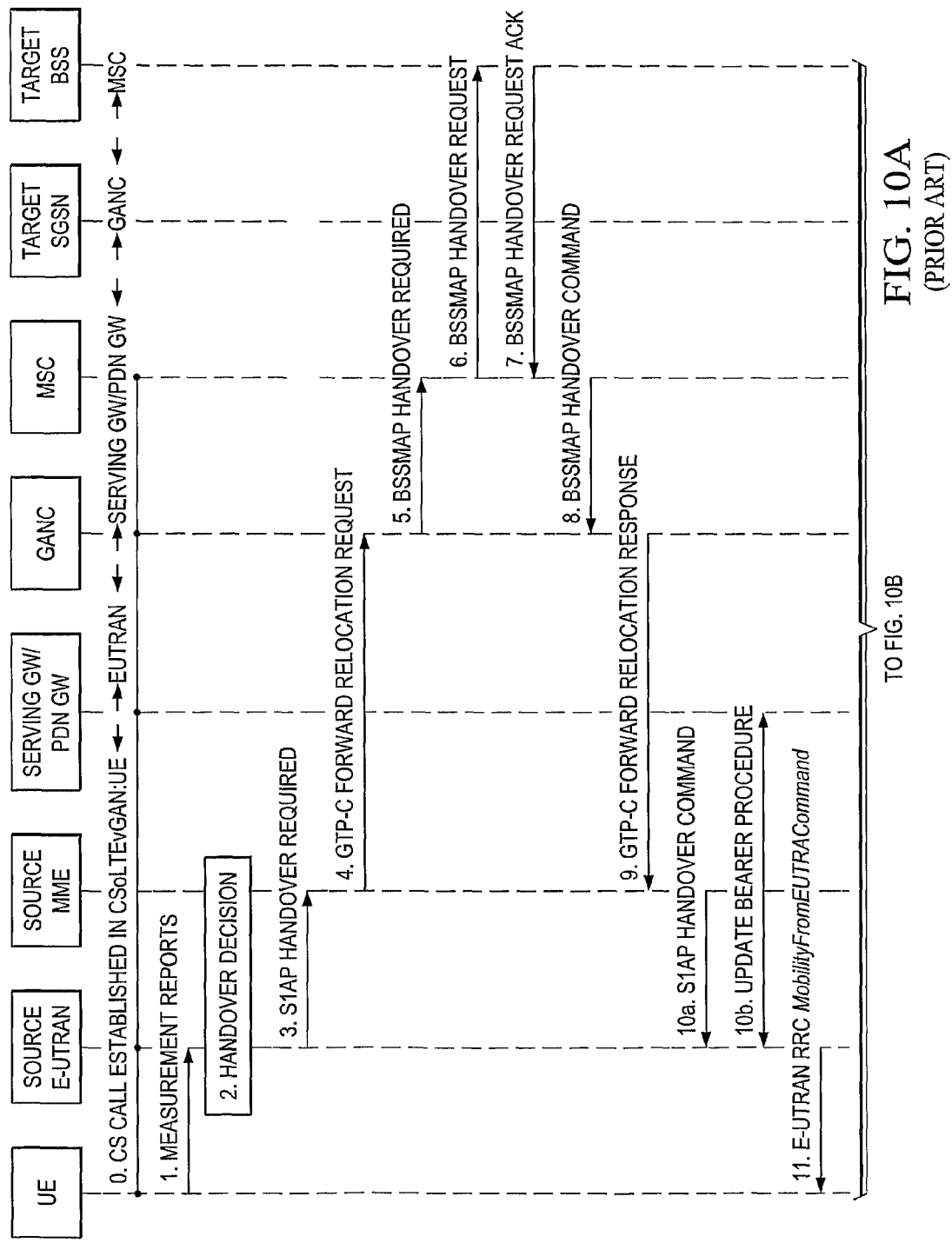
Figure 10B:
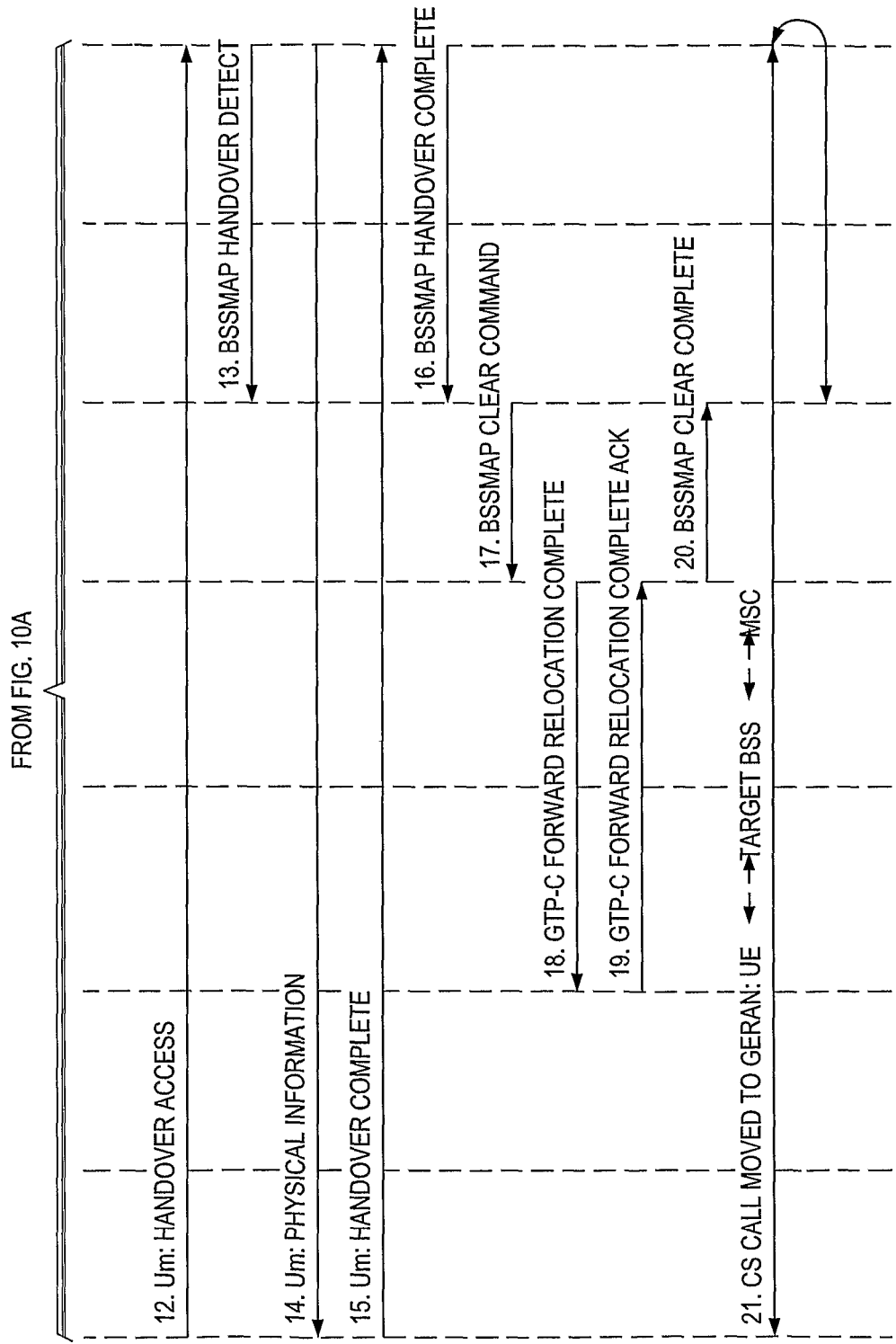
Figure 11:
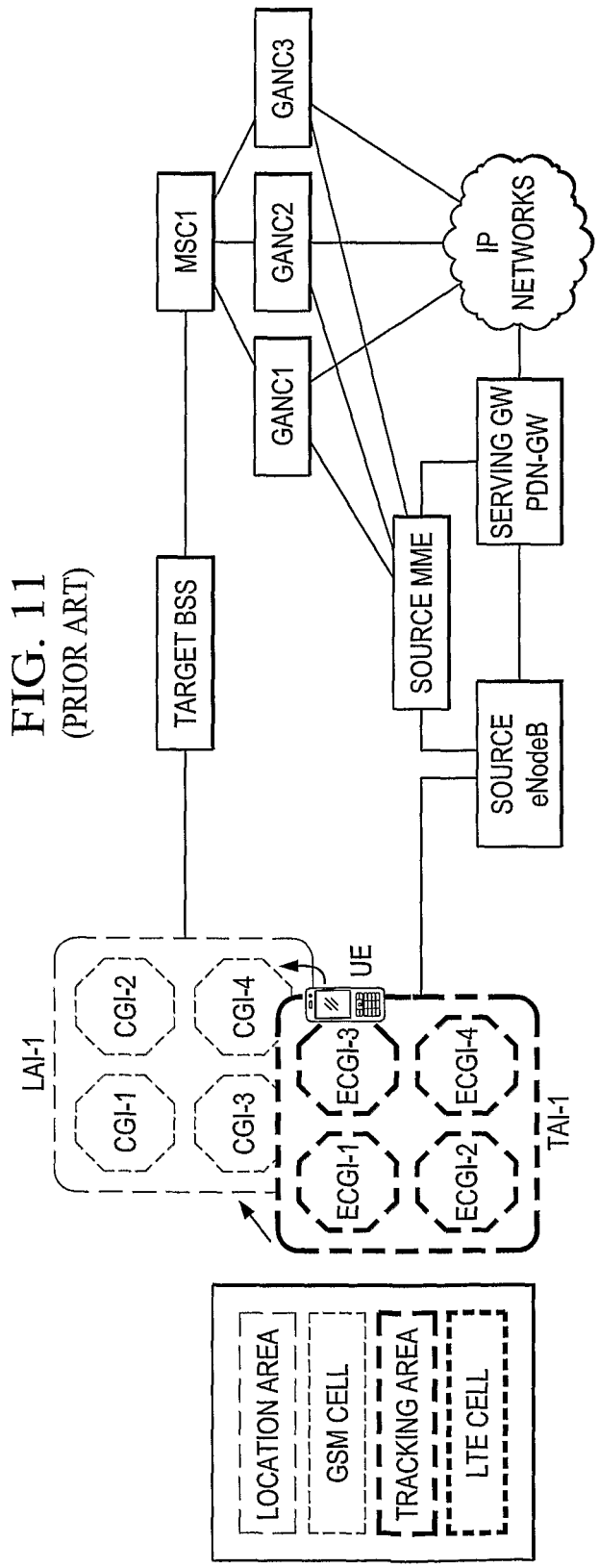
FIG. 11 (PRIOR ART) is a diagram of an exemplary network scenario used to explain the problem with the handover of a CS domain call from CSoLTEvGAN to GERAN/UTRAN.
Figure 12B:
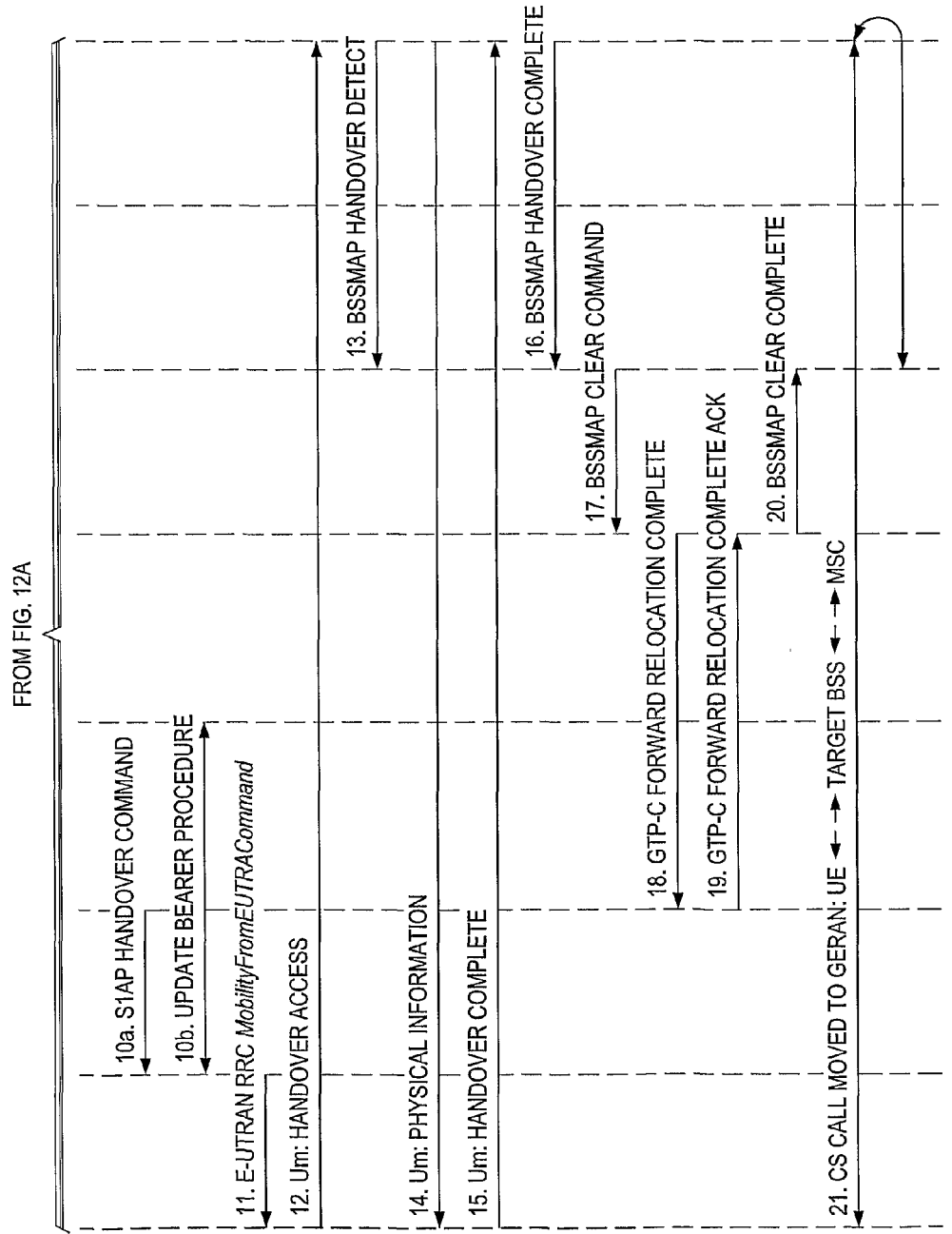
FIGS. 12-14 are various diagrams used to help explain a method for preventing a CS domain call from being dropped during a CSoLTEvGAN to GERAN/UTRAN handover procedure in accordance with a first embodiment of the present invention.

FIGS. 12A-12B is a signal flow diagram that shows the difference between the first embodiment of the present invention and the traditional Handover from CSoLTEvGAN to GERAN procedure shown in FIGS. 10A-10B (PRIOR ART). The present invention is about ensuring that the MME 1200 forwards a handover request 1202 (GTP-C Forward Relocation Request 1202) to the correct GANC 1204 (step 4) so that the normal handover can be triggered towards the MSC 1206 (step 5). The correct GANC 1204 is the same GANC 1204 that the UE 1208 was registered to before moving towards the GERAN/UTRAN network. The correct GANC 1204 holds the UE GAN registration context and the CS domain call for the UE 1208. An exemplary scenario is provided next to help explain in detail one way that the MME 1200 can forward or eventually forward the handover request 1202 (GTP-C Forward Relocation Request 1202) to the correct GANC 1204 (step 4) so that the normal handover can be triggered towards the MSC 1206 (step 5).

Figure 13:
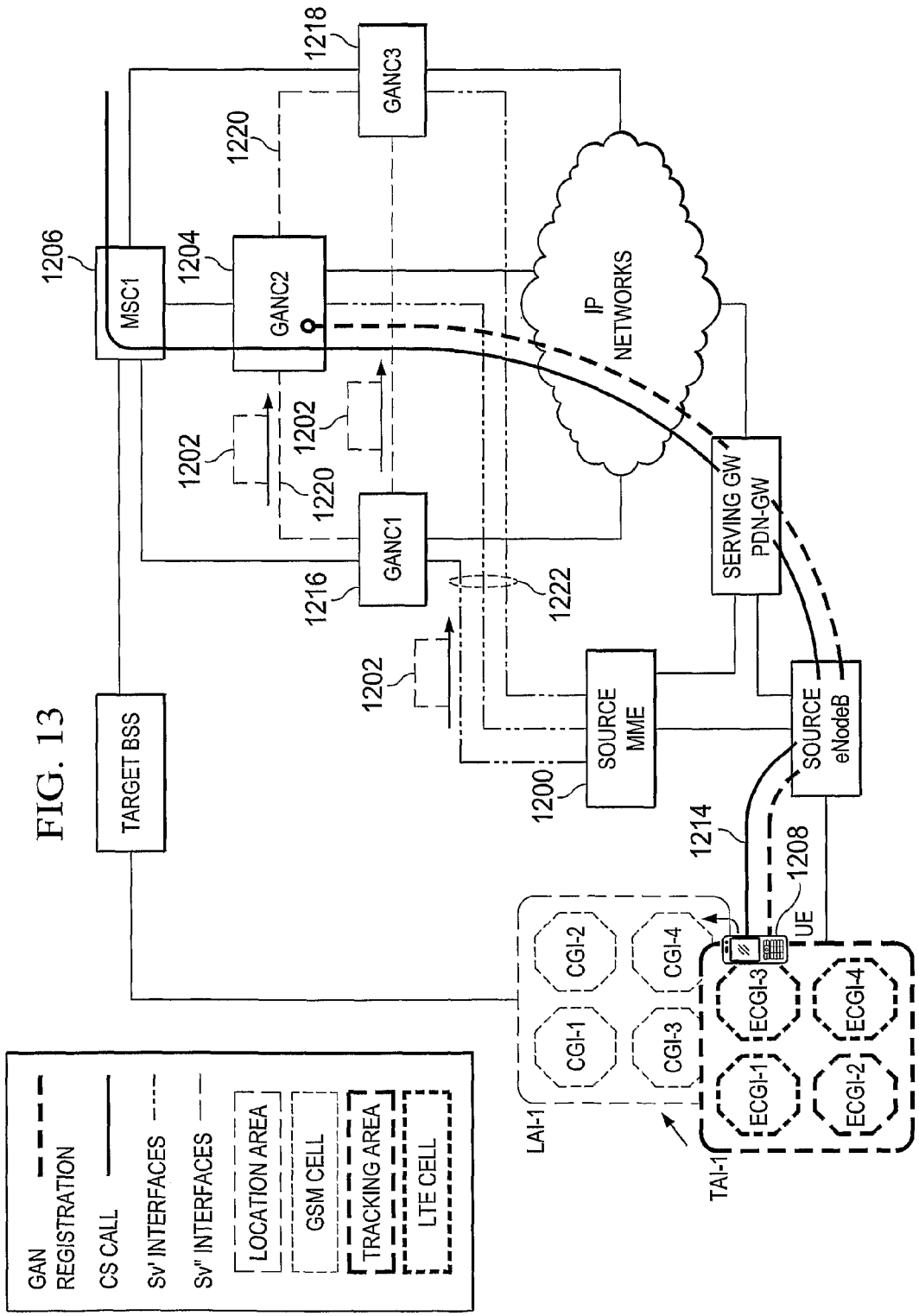
Figure 14A:
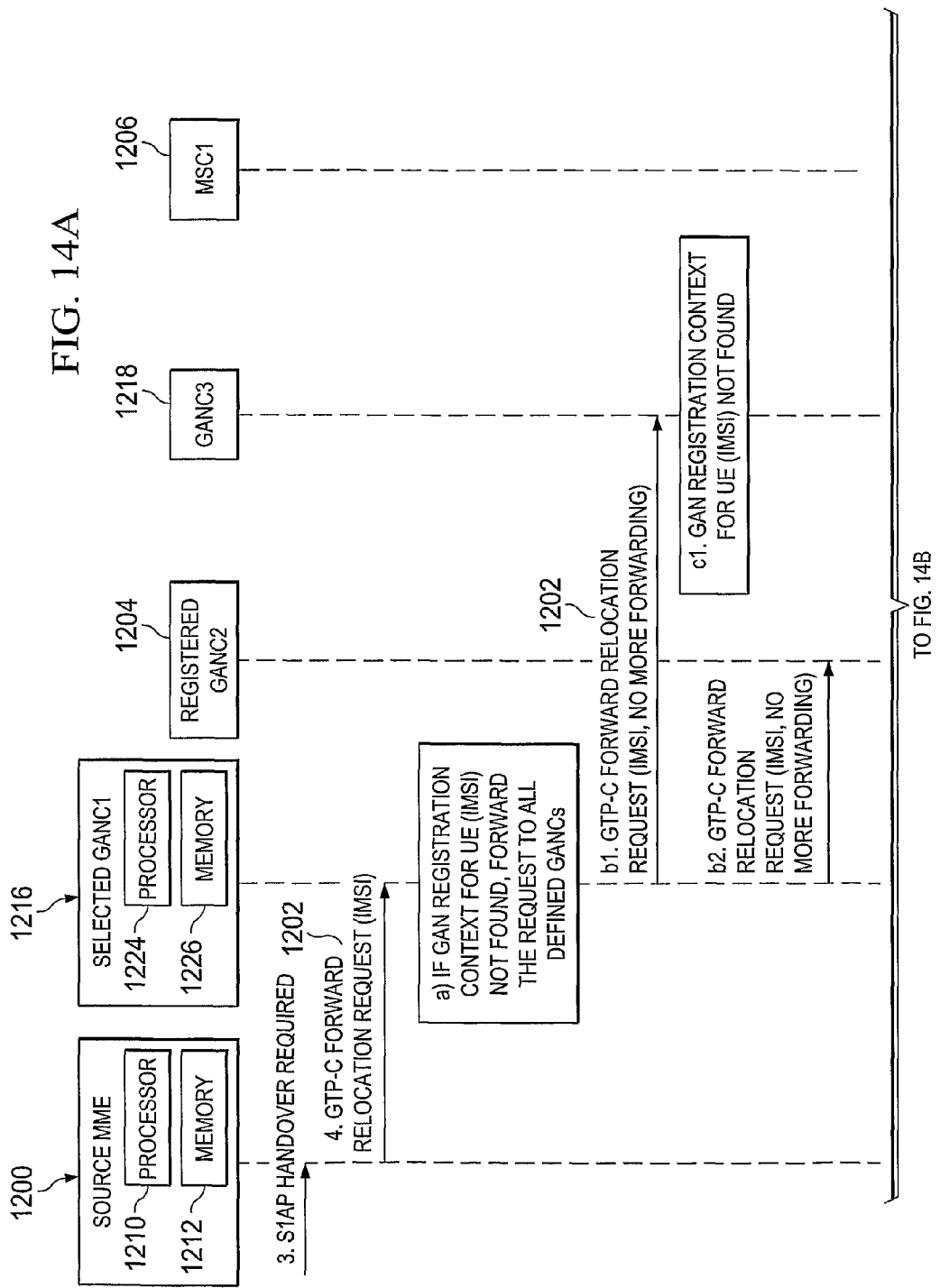
Figure 14B:
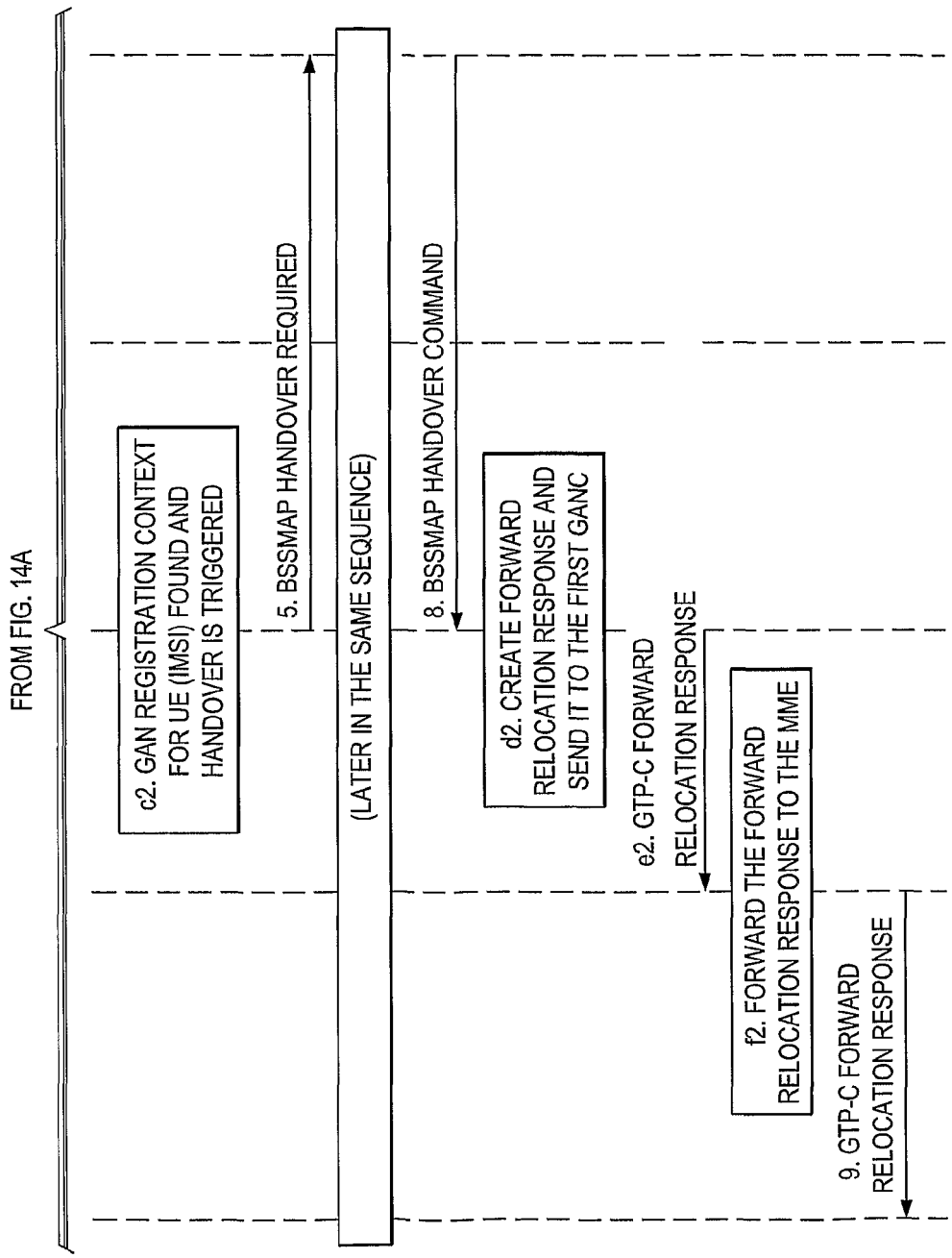

FIGS. 13-14 are two diagrams associated with an exemplary network scenario which has been provided to help explain the first embodiment of the present invention. In this example, the UE 1208 is registered to GANC2 1204 and has an active CS call 1214 via GANC2 1204 and MSC1 1206. Plus, three different GANCs are shown namely GANC1 1216, GANC2 1204 and GANC3 1218 which are connected to one another with Sv" interfaces 1220. The MME 1200 has Sv' interfaces 1222 to all three GANCS 1204, 1216 and 1218. The UE 1208 is also moving from ECGI-3 cell in TAI-1 towards GSM cell with CGI-4 in LA with LAI-1. Upon the UE 1208 moving towards CGI-4, the source MME 1200 uses the normal target cell/LA based selection of the GANC (i.e. as it would be triggering SRVCC handover) and sends the handover request 1202 (i.e. GTP-C FORWARD RELOCATION REQUEST 1202) to a selected GANC, in this case GANC1 1216 (see step 4 in FIG. 14A).

As the GANC1 1216 does not hold the GAN Registration context or the CS call for the addressed UE 1208 (addressed by IMSI in the GTP-C FORWARD RELOCATION REQUEST message), it will forward the handover request 1202 to other GANCs defined in the GANC1 1216. The handover request 1202 is forwarded to GANC2 1204 and GANC3 1218. In this example, GANC2 1204 is holding the GAN Registration context for the UE 1208 and will act upon the received handover request 1202 and trigger the handover procedure towards the MSC1 1206 (see steps a-c in FIG. 14A). GANC3 1218 also receives the handover request 1202 and since it does not find the GAN registration context for the UE 1208 no further actions are taken (see steps b1 and c1 in FIG. 14A). At this point, all signaling related to the handover procedure between the MME 1200 and MSC1 1206 is transferred between the firstly addressed GANC1 1216 and GANC2 1204 which is holding the UE context. Alternatively, the GANC2 1204 may in step e2 when sending a Forward relocation response may send it directly to the MME 1200. Then, the MME 1200 will send all related handover signaling directly to GANC2 1204 and bypass the selected GANC1 1216.

In the example above, the GANC2 1204 and GANC3 1218 should also determine if the received GTP-C FORWARD RELOCATION REQUEST message 1202 is from the MME 1200 or another GANC 1216. The GANC2 1204 and GANC 3 1218 can make this determination in anyone of a variety of ways: (1) determining if there is a new indicator "handover already forwarded" in the received GTP-C FORWARD RELOCATION REQUEST message 1202 (the selected GANC1 1204 could send this indicator with the Sv" interfaces 1220 but not with the Sv' interfaces 1222); (2) referring to a table therein to map the sending IP address in the received GTP-C FORWARD RELOCATION REQUEST message 1202 to either a GANC 1216 or MME 1200; (3) or referring to a table therein to map the TCP port number associated with the received GTP-C FORWARD RELOCATION REQUEST message 1202 to either a GANC 1216 or MME 120. The GANC2 1204 and GANC3 1218 make this determination so they can determine whether or not to forward the handover request 1202 any further to other GANCs. For instance, GANC3 1218 in this example would receive the handover request 1202 and determine that GANC1 1204 sent the handover request 1202 and since GANC3 1218 is not holding the GAN registration context for the UE 1208 it may not forward the handover request 1202 any further.

In the first embodiment, the simplest case is where only a single Handover Request 1202 is forwarded by the selected GANC1 1216 towards the other GANCs and these other GANCs do not forward the handover request any further. In another case, a "GANC hierarchy" can be defined. This means that there can be multiple steps of handover forwarding between the GANCs. For example, the selected GANC1 1216 would forward the handover request 1202 to a subset of the GANCs and these GANCs may perform consecutive handover forwarding towards another set of GANCs and so on until locating the correct GANC. Naturally, specific mechanisms would be used in the last case to ensure that there are no loops in the "GANC hierarchy".

In summary, the MME 1200 and the selected GANC 1216 are able to prevent a CS domain call for UE 1208 from being dropped during a CSoLTEvGAN to GERAN/UTRAN handover procedure, where the UE registered with one of a plurality of Generic Access Network Controllers, GANCs based on Long-Term Evolution, LTE, and Generic Access Network, GAN, technology. To enable this, the MME 1200 has one or more processors 1210 and at least one memory 1212 (storage 1212) that includes processor-executable instructions where the processor(s) 1210 are adapted to interface with the at least one memory 1212 and execute the processor-executable instructions to: (1) control packet switched bearers used in the CS domain call 1214 of UE 1208 which involves the registered GANC (1204), where the registered GANC 1204 holds the UE GAN registration context and the CS domain call for the UE 1208 (see step 0 in FIG. 12); (2) when the UE 1208 moves towards the GERAN/UTRAN network, select one of the plurality of GANCs 1204, 1216 and 1218 (e.g., GANC1 1216) based on a GERAN/UTRAN cell identifier or a LAI associated with a location of the UE 1208; and (3) send the handover request 1202 to the selected GANC 1216 (see step 4 in FIG. 14) (note: the one or more processors 1210 and the at least one memory 1212 are implemented, at least partially, as software, firmware, hardware, or hard-coded logic).

Then, the selected GANC 1216 upon receiving the handover request 1202 uses one or more processors 1224 and at least one memory 1226 (storage 1226) that includes processor-executable instructions where the processor(s) 1224 are adapted to interface with the at least one memory 1226 and execute the processor-executable instructions to: (1) determine if the UE GAN registration context and the CS domain call for the UE 1208 are held therein; (2) if yes, then handle the handover request 1202 for the CS domain call of the UE 1208; and (3) if no, then forward the handover request 1202 to other GANCs (e.g., GANC2 1204 and GANC3 1218) which could possibly hold the UE GAN registration context and the CS domain call for the UE 1208 (see steps a, b1 and b2 in FIG. 14A). If one of the other GANCs 1204 and 1218 (e.g., GANC2 1204) holds the UE GAN registration context and the CS domain call for the UE 1208 then that GANC will handle the handover request 1202 for the CS domain call of the UE 1208 (note: the one or more processors 1224 and the at least one memory 1226 are implemented, at least partially, as software, firmware, hardware, or hard-coded logic).

Second Embodiment

GANC IP Address or String Sent to MME

Figure 15A:
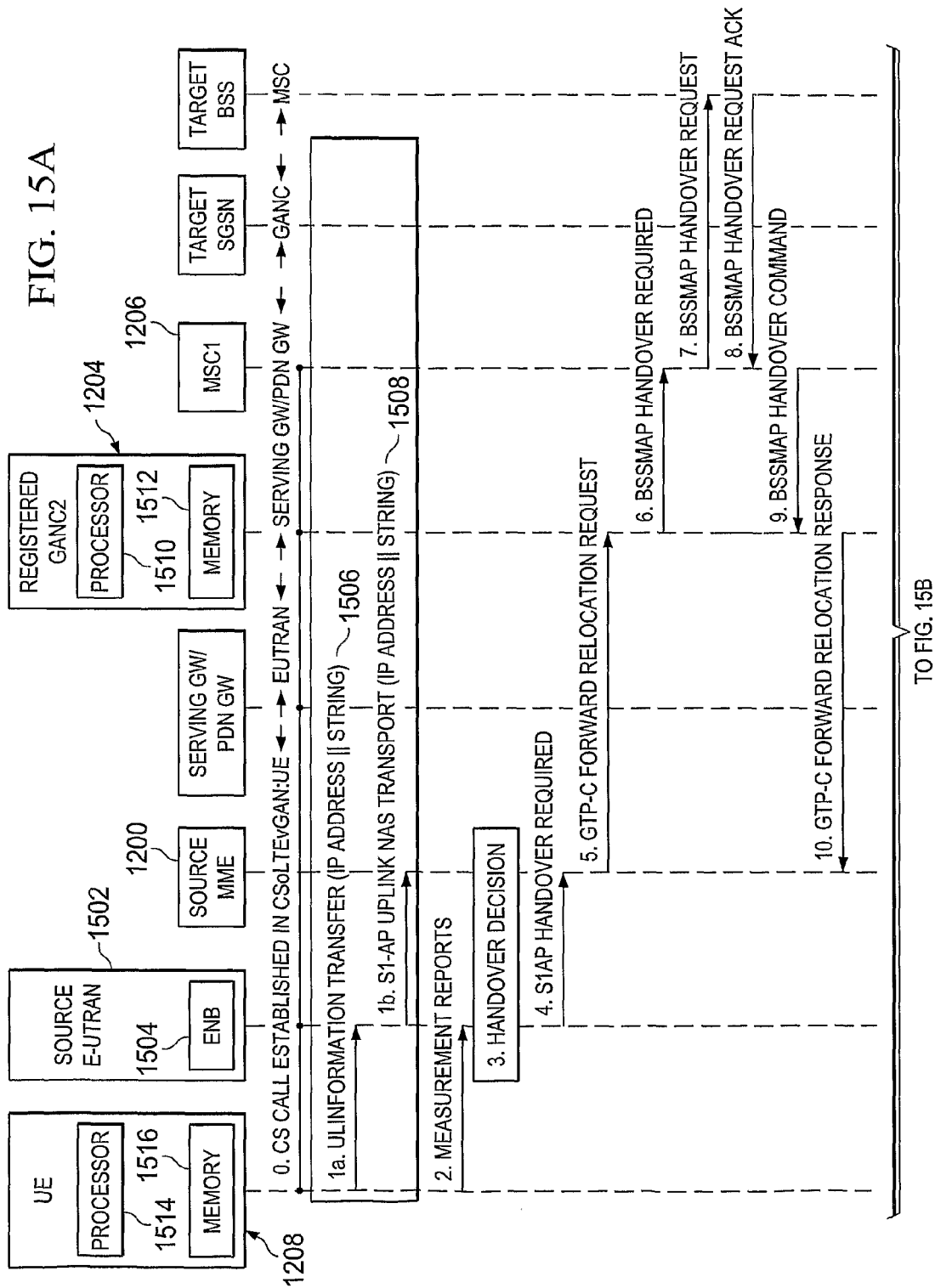
FIGS. 15A-15B is a signal flow diagram used to help explain a method for preventing a CS domain call from being dropped during a CSoLTEvGAN to GERAN/UTRAN handover procedure in accordance with a second embodiment of the present invention.
Figure 15B:
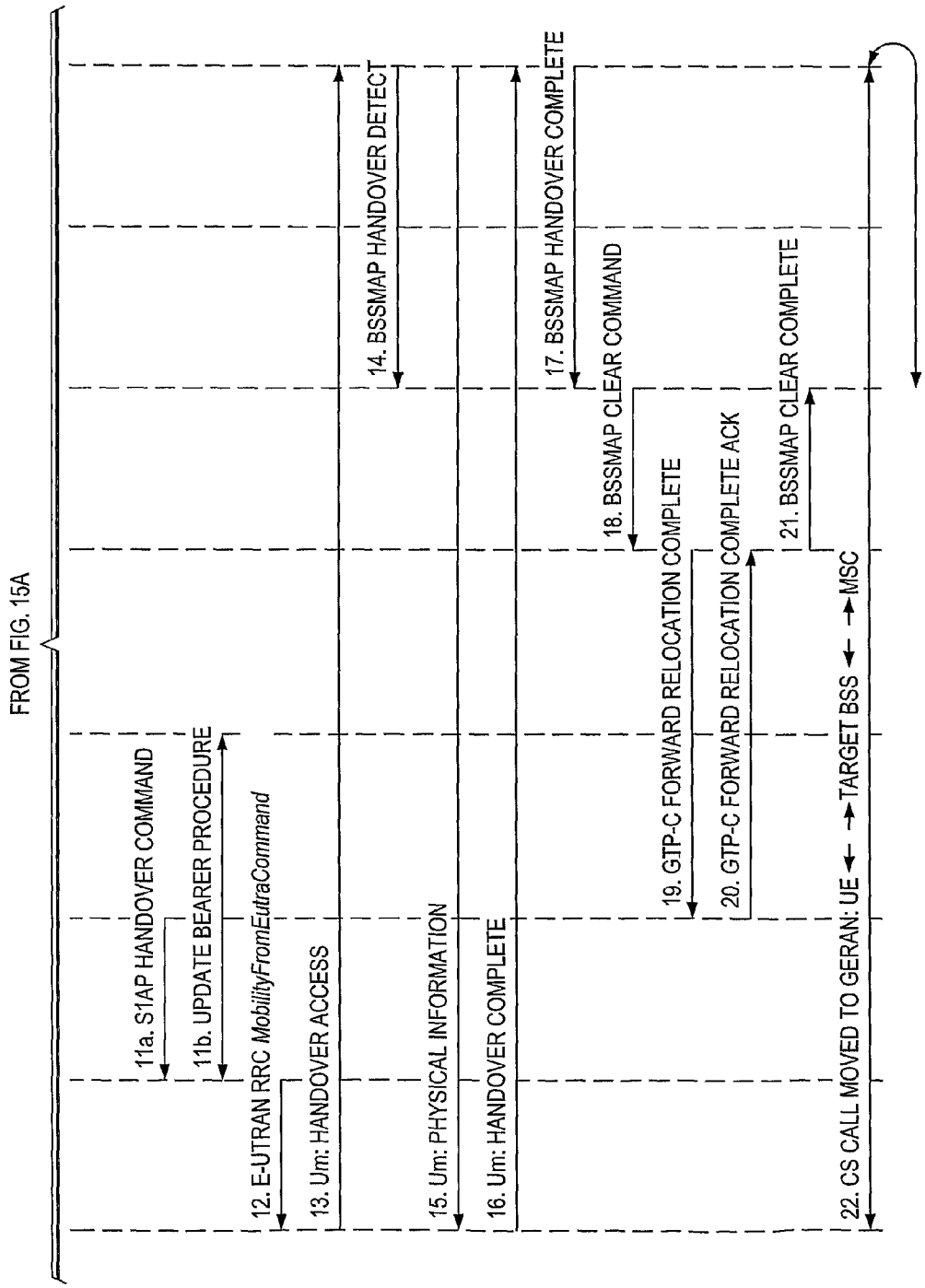

In the second embodiment, the MME1200 uses the GANC IP address or string received from the UE 1208 to send the GTP-C Forward Relocation Request message 1202 to the registered GANC 1204 (i.e., GANC2 1204). The string can be translated to a GANC IP address associated with the registered GANC2 1204 because the string is a FQDN, or the MME 1200 could use the string to construct an FQDN, or the MME 1200 has a table translating the string (name) to the GANC address. An exemplary sequence is illustrated in FIGS. 15A-15B, where during the GAN registration procedure, the UE 1208 obtains the GANC IP address or a string to used by MMEs 1200 for handover signaling to a specific GANC, for example in the GA-RC REGISTER ACCEPT message (not illustrated). After the call establishment, the UE 1208 adds the GANC IP address or the string within the 3GPP TS 36.331 ULInformationTransfer message 1506 and sends it to the E-UTRAN 1502 (see step 1a in FIG. 15A). Then, the eNB 1504 (eNodeB 1504) sends the GANC IP address or string to the MME 1200 in a S1-AP UPLINK NAS TRANSFER message 1508 (see step 1b in FIG. 15A). The MME 1200 stores the address/string and when the UE 1208 moves to GERAN/UTRAN then the MME 1200 uses the address/string to send the handover request 1202 to the registered GANC 1205 (see step 5 in FIG. 15A).

One skilled in the art will appreciate that there are many different ways that can be used for transferring the GANC address information from the UE 1208 to the MME 1200 (steps 1a and 1b in FIG. 15). For instance, this information could be included in an existing or a new NAS message between the UE 1208 and the MME 1200 or it could be transferred as described above using separate RRC and S1AP protocol messages. It should be noted that if the string translates to a FQDN, then the MME 1200 would need to perform a DNS lookup and for those cases the FQDN needs to identify a unique GANC. An alternative to this scheme is to not wait until a call is established but to have the UE 1208 always send the GANC IP address or the string to the MME 1200 directly when it receives it from the registered GANC 1204 (i.e. GANC2 1204).

If there is an E-UTRAN internal handover where the MME 1200 is changed, then the IP address (or string) would be transferred and stored in the new MME (not shown). This information can be either forwarded from the Source MME 1200 to the Target MME or sent from the UE 1208 to the Target MME, for example the UE 1208 could include the information in TAU signaling towards the target MME as TAU is always triggered at Inter-MME (pool) handovers. The MME uses either of these GANC addresses to send the GTP-C Forward Relocation Request 1202 to the registered GANC 1204.

In summary, the registered GANC 1204 and the UE 1208 are able to prevent a CS domain call 1214 for UE 1208 from being dropped during a CSoLTEvGAN to GERAN/UTRAN handover procedure. The registered GANC 1204 use one or more processors 1510 and at least one memory 1512 (storage 1512) that includes processor-executable instructions where the processor(s) 1510 are adapted to interface with the at least one memory 1512 and execute the processor-executable instructions to: (1) send GANC address information associated with the registered GANC 1204 to the UE 1208 such that when the UE 1208 moves towards the GERAN/UTRAN the UE 1208 has already passed the GANC address information to the MME 1200 which then uses the GANC address information to forward the handover request 1202 for the CS domain call 1214 to the registered GANC 1204 (note: the one or more processors 1510 and the at least one memory 1512 are implemented, at least partially, as software, firmware, hardware, or hard-coded logic). Likewise, the UE 1208 uses one or more processors 1514 and at least one memory 1516 (storage 1516) that includes processor-executable instructions where the processor(s) 1514 are adapted to interface with the at least one memory 1516 and execute the processor-executable instructions to: (1) receive GANC address information associated with the registered GANC 1204; and (2) pass the GANC address information to the MME 1200 so that when the UE 1208 moves towards the GERAN/UTRAN the MME 1200 uses the GANC address information to forward the handover request 1202 for the CS domain call 1214 to the registered GANC 1204 (note: the one or more processors 1514 and the at least one memory 1516 are implemented, at least partially, as software, firmware, hardware, or hard-coded logic).

It should be appreciated that the description of the present invention herein used the procedures and message names for GAN A/Gb mode i.e. when the GANC is connected to the CN using the A and Gb-interfaces. However, the present invention can be applied equally well for GAN Iu-mode i.e. when the GANC is connected to the CS using an Iu interface. One difference is that the message names and protocols used between the MS/UE, GANC and CN are different. For example, the GA-CSR protocol messages are used in GAN A/Gb mode and GA-RRC protocol messages are used in GAN-Iu mode. In a similar way either RANAP messages or BSSMAP messages are used between the GANC and the CN.

Although two embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the present invention that as has been set forth and defined within the following claims.

The invention claimed is:

1. A method implemented by a Mobile Management Entity, MME, for preventing a circuit switched, CS, domain call of a user equipment, UE from being dropped during a handover procedure, where the UE registered with one of a plurality of Generic Access Network Controllers, GANCs, based on Long-Term Evolution, LTE, and Generic Access Network, GAN, technology, the method implemented by the MME comprising the steps of:
controlling, by the MME, a bearer used within the CS domain call of the UE which involves the registered GANC, where the registered GANC holds a UE GAN registration context and the CS domain call for the UE; and
upon the UE moving towards a GSM Radio Access Network/UMTS Radio Access Network, GERAN/UTRAN, selecting, by the MME, one of the plurality of GANCs based on a GERAN/UTRAN cell identifier or a Location Area Identifier, LAI, associated with a location of the UE when the UE moves towards the GERAN/UTRAN, and sending, by the MME, a handover request to the selected GANC which checks to see if the UE GAN registration context and the CS domain call for the UE are held therein where if the result is yes then the selected GANC handles the handover request for the CS domain call of the UE otherwise the selected GANC forwards the handover request to other GANCs which could possibly hold the UE GAN registration context and the CS domain call for the UE and the one of the other GANCs which holds the UE GAN registration context and the CS domain call for the UE handles the handover request for the CS domain call of the UE.

2. The method of claim 1, wherein the selected GANC adds an indicator to the forwarded handover request, where the indicator indicates that the forward handover request is from the selected GANC and not the MME.

3. The method of claim 1, wherein when the selected GANC forwards the handover request to the other GANCs and one of those GANCs hold the UE GAN registration context and the CS domain call for the UE then the selected GANC handles handover signaling between the MME and the one GANC that holds the UE GAN registration context and the CS domain call for the UE.

4. The method of claim 1, wherein when the selected GANC forwards the handover request to the other GANCs and none of those GANCs hold the UE GAN registration context and the CS domain call for the UE then those GANGS forward the handover request to other GANCs and so on until one GANC is found that holds the UE GAN registration context and the CS domain call for the UE.

5. A Mobile Management Entity, MME, for preventing a circuit switched, CS, domain call of a user equipment, UE from being dropped during a handover procedure, where the UE registered with one of a plurality of Generic Access Network Controllers, GANCs, based on Long-Term Evolution, LTE, and Generic Access Network, GAN, technology, the MME comprising:
a processor; and
a memory that stores processor-executable instructions where the processor interfaces with the memory and executes the processor-executable instructions to:

control a packet bearer used in the CS domain call of the UE which involves the registered GANC, where the registered GANC holds a UE GAN registration context and the CS domain call for the UE;

when the UE moves towards a GSM Radio Access Network/UMTS Radio Access Network, GERAN/UTRAN, select one of the plurality of GANCs based on a GERAN/UTRAN cell identifier or a Location Area Identifier, LAI, associated with a location of the UE when the UE moves towards the GERAN/UTRAN, and send a handover request to the selected GANC which checks to see if the UE GAN registration context and the CS domain call for the UE are held therein where if the result is yes then the selected GANC handles the handover request for the CS domain call of the UE otherwise the selected GANC forwards the handover request to other GANCs which could possibly hold the UE GAN registration context and the CS domain call for the UE and the one of the other GANCs which holds the UE GAN registration context and the CS domain call for the UE handles the handover request for the CS domain call of the UE; and wherein the processor and the memory are components of the MME.

6. The MME of claim 5, wherein selected GANC adds an indicator to the forwarded handover request, where the indicator indicates that the forward handover request is from the selected GANC and not the MME.

7. The MME of claim 5, wherein when the selected GANC forwards the handover request to the other GANCs and one of those GANCs hold the UE GAN registration context and the CS domain call for the UE then the selected GANC handles handover signaling between the MME and the one GANC that holds the UE GAN registration context and the CS domain call for the UE.

8. The MME of claim 5, wherein when the selected GANC forwards the handover request to the other GANCs and none of those GANCs hold the UE GAN registration context and the CS domain call for the UE then those GANGS forward the handover request to other GANCs and so on until one GANC is found that holds the UE GAN registration context and the CS domain call for the UE.

9. A system comprising:
a Mobile Management Entity, MME, and
a plurality of Generic Access Network Controllers, GANCs, where a user equipment, UE, is registered with one of the GANCs based on Long-Term Evolution, LTE, and Generic Access Network, GAN, technology,
the MME is configured to control a bearer used within a circuit switched, CS, domain call of the UE which involves the registered GANC,
the registered GANC is configured to hold a UE GAN registration context and the CS domain call for the UE,
upon the UE moving towards a GSM Radio Access Network/UMTS Radio Access Network, GERAN/UTRAN, the MME is configured to:
select one of the plurality of GANCs based on a GERAN/UTRAN cell identifier or a Location Area Identifier, LAI, associated with a location of the UE when the UE moves towards the GERAN/UTRAN, and
send a handover request to the selected GANC, and
the selected GANC is configured to check to see if the UE GAN registration context and the CS domain call for the UE are held therein where if the result is yes then the selected GANC is configured to handle the handover request for the CS domain call of the UE otherwise the selected GANC is configured to forward the handover request to other GANCs which could possibly hold the UE GAN registration context and the CS domain call for the UE, and where the one of the other GANCs which holds the UE GAN registration context and the CS domain call for the UE is configured to handle the handover request for the CS domain call of the UE.

10. The system of claim 9, wherein the selected GANC is configured to add an indicator to the forwarded handover request, where the indicator indicates that the forward handover request is from the selected GANC and not the MME.

11. The system of claim 9, wherein when the selected GANC forwards the handover request to the other GANCs and one of those GANCs hold the UE GAN registration context and the CS domain call for the UE then the selected GANC is configured to handle handover signaling between the MME and the one GANC that holds the UE GAN registration context and the CS domain call for the UE.

12. The system of claim 9, wherein when the selected GANC forwards the handover request to the other GANCs and none of those GANCs hold the UE GAN registration context and the CS domain call for the UE then those GANCs are configured to forward the handover request to other GANCs and so on until one GANC is found that holds the UE GAN registration context and the CS domain call for the UE.

13. A method for preventing a circuit switched, CS, domain call of a user equipment, UE, from being dropped during a handover procedure, where the UE registered with one of a plurality of Generic Access Network Controllers, GANCs, based on Long-Term Evolution, LTE, and Generic Access Network, GAN, technology, and a Mobile Management Entity, MME, controls packet bearers of the CS domain call of the UE which involves the registered GANC, where the registered GANC holds a UE GAN registration context and the CS domain call for the UE, and when the UE moved towards a GSM EDGE Radio Access Network/UMTS Radio Access Network, GERAN/UTRAN the MME selected one of the plurality of GANCs based on a GERAN/UTRAN cell identifier or a Location Area Identifier, LAI, associated with a location of the UE and transmitted the handover request to the selected GANC, the method implemented by the selected GANC comprising the steps of:
determining, by the selected GANC, if the UE GAN registration context and the CS domain call for the UE are held therein;
if yes, then handling, by the selected GANC, the handover request for the CS domain call of the UE;
if no, then forwarding, by the selected GANC, the handover request to other GANCs which could possibly hold the UE GAN registration context and the CS domain call for the UE and the one of the other GANCs which holds the UE GAN registration context and the CS domain call for the UE will handle the handover request for the CS domain call of the UE.

14. The method of claim 13, wherein the forwarding step further includes:
adding an indicator to the forwarded handover request, where the indicator indicates that the forward handover request is from the selected GANC and not the MME.

15. The method of claim 13, wherein when the selected GANC forwards the handover request to the other GANCs and one of those GANCs hold the UE GAN registration context and the CS domain call for the UE then the selected GANC handles handover signaling between the MME and the one GANC that holds the UE GAN registration context and the CS domain call for the UE.

16. The method of claim 13, wherein when the selected GANC forwards the handover request to the other GANCs and none of those GANCs hold the UE GAN registration context and the CS domain call for the UE then those GANCs forward the handover request to other GANCs and so on until one GANC is found that holds the UE GAN registration context and the CS domain call for the UE.

17. In a system for preventing a circuit switched, CS, domain call of a user equipment, UE, from being dropped during a handover procedure, where the UE registered with one of a plurality of Generic Access Network Controllers, GANCs, based on Long-Term Evolution, LTE, and Generic Access Network, GAN, technology, where a Mobile Management Entity, MME, controls packet bearers of the CS domain call of the UE which involves the registered GANC, where the registered GANC holds a UE GAN registration context and the CS domain call for the UE, and when the UE moved towards a GSM EDGE Radio Access Network/UMTS Radio Access Network, GERAN/UTRAN the MME selected one of the plurality of GANCs based on a GERAN/UTRAN cell identifier or a Location Area Identifier, LAI, associated with a location of the UE and transmitted the handover request to the selected GANC, the selected GANC comprising:
  a processor; and
  a memory that stores processor-executable instructions where the processor interfaces with the memory and executes the processor-executable instructions to:
    determine if the UE GAN registration context and the CS domain call for the UE are held therein;
    if yes, then handle the handover request for the CS domain call of the UE;
    if no, then forward the handover request to other GANCs which could possibly hold the UE GAN registration context and the CS domain call for the UE and the one of the other GANCs which holds the UE GAN registration context and the CS domain call for the UE will handle the handover request for the CS domain call of the UE; and
  wherein the processor and the memory are components of the selected GANC.

18. The selected GANC of claim 17, wherein the processor adds an indicator to the forwarded handover request, where the indicator indicates that the forward handover request is from the selected GANC and not the MME.

19. The selected GANC of claim 17, wherein when the processor forwards the handover request to the other GANCs and one of those GANCs hold the UE GAN registration context and the CS domain call for the UE then the processor handles handover signaling between the MME and the one GANC that holds the UE GAN registration context and the CS domain call for the UE.

20. The selected GANC of claim 17, wherein when the processor forwards the handover request to the other GANCs and none of those GANCs hold the UE GAN registration context and the CS domain call for the UE then those GANGS forward the handover request to other GANCs and so on until one GANC is found that holds the UE GAN registration context and the CS domain call for the UE.

21. A method for preventing a circuit switched, CS, domain call of a user equipment, UE, from being dropped during a handover procedure, where the UE registered with one of a plurality of Generic Access Network Controllers, GANCs, based on Long-Term Evolution, LTE, and Generic Access Network, GAN, technology, where a Mobile Management Entity, MME, controls packet bearers of the CS domain call of the UE which involves the registered GANC, where the registered GANC holds a UE GAN registration context and the CS domain call for the UE, the method implemented by the registered GANC comprising the step of:
  sending, by the registered GANC during a GAN registration procedure, GANC address information associated with the registered GANC to the UE such that when the UE moves towards a GSM EDGE Radio Access Network/UMTS Radio Access Network, GERAN/UTRAN the UE has already passed the GANC address information to the MME which then uses the GANC address information to forward the handover request for the CS domain call to the registered GANC.

22. In a system for preventing a circuit switched, CS, domain call of a user equipment, UE, from being dropped during a handover procedure, where the UE registered with one of a plurality of Generic Access Network Controllers, GANCs, based on Long-Term Evolution, LTE, and Generic Access Network, GAN, technology, where a Mobile Management Entity, MME, controls packet bearers of the CS domain call of the UE which involves the registered GANC, where the registered GANC holds a UE GAN registration context and the CS domain call for the UE, the registered GANC comprising:
  a processor; and
  a memory that stores processor-executable instructions where the processor interfaces with the memory and executes the processor-executable instructions to:
    send, during a GAN registration procedure, GANC address information associated with the registered GANC to the UE such that when the UE moves towards a GSM EDGE Radio Access Network/UMTS Radio Access Network, GERAN/UTRAN the UE has already passed the GANC address information to the MME which then uses the GANC address information to forward a handover request for the CS domain call to the registered GANC; and
  wherein the processor and the memory are components of the registered GANC.

23. A method for preventing a circuit switched, CS, domain call of a user equipment, UE, from being dropped during a handover procedure, where the UE registered with one of a plurality of Generic Access Network Controllers, GANCs, based on Long-Term Evolution, LTE, and Generic Access Network, GAN, technology, where a Mobile Management Entity, MME, controls packet bearers of the CS domain call of the UE which involves the registered GANC, where the registered GANC holds a UE GAN registration context and the CS domain call for the UE, the method implemented by the UE comprising the step of:
  receiving, by the UE, GANC address information associated with the registered GANC; and
  passing, by the UE, the GANC address information to the MME so that when the UE moves towards a GSM EDGE Radio Access Network/UMTS Radio Access Network, GERAN/UTRAN the MME uses the GANC address information to forward a handover request for the CS domain call to the registered GANC.

24. In a system for preventing a circuit switched, CS, domain call of a user equipment, UE, from being dropped during a handover procedure, where the UE registered with one of a plurality of Generic Access Network Controllers, GANCs, based on Long-Term Evolution, LTE, and Generic Access Network, GAN, technology, where a Mobile Management Entity, MME, controls packet bearers of the CS domain call of the UE which involves the registered GANC, where the registered GANC holds a UE GAN registration context and the CS domain call for the UE, the UE comprising:
- a processor; and
- a memory that stores processor-executable instructions where the processor interfaces with the memory and executes the processor-executable instructions to:
  - receive GANC address information associated with the registered GANC; and
  - pass the GANC address information to the MME so that when the UE moves towards a GSM EDGE Radio Access Network/UMTS Radio Access Network, GERAN/UTRAN the MME uses the GANC address information to forward a handover request for the CS domain call to the registered GANC; and
- wherein the processor and the memory are components of the UE.

* * * * *